United States Patent
Nelson et al.

(10) Patent No.: US 8,203,592 B2
(45) Date of Patent: Jun. 19, 2012

(54) VIDEOCONFERENCE RECORDING, POST-PROCESSING, AND PLAYBACK

(75) Inventors: Steve Nelson, San Jose, CA (US); Victor Ivashin, Danville, CA (US)

(73) Assignee: Seiko Epson Corporation, Tokyo (JP)

( * ) Notice: Subject to any disclaimer, the term of this patent is extended or adjusted under 35 U.S.C. 154(b) by 1271 days.

(21) Appl. No.: 11/925,306

(22) Filed: Oct. 26, 2007

(65) Prior Publication Data

US 2009/0110368 A1      Apr. 30, 2009

(51) Int. Cl.
*H04N 7/14* (2006.01)
(52) U.S. Cl. ............. 348/14.08; 348/14.01; 348/211.12; 370/260; 709/204; 379/202.1
(58) Field of Classification Search .... 348/14.01–14.03, 348/14.07–14.1, 552, 211.12; 379/202.01–206.01; 370/260; 709/204
See application file for complete search history.

(56) References Cited

U.S. PATENT DOCUMENTS

| | | | |
|---|---|---|---|
| 5,786,844 A * | 7/1998 | Rogers et al. .............. | 348/14.12 |
| 5,978,835 A | 11/1999 | Ludwig et al. | |
| 6,269,122 B1 | 7/2001 | Prasad et al. | |
| 6,674,459 B2 | 1/2004 | Ben-Shackar et al. | |
| 7,084,898 B1 | 8/2006 | Firestone et al. | |
| 7,466,334 B1 * | 12/2008 | Baba ......................... | 348/14.06 |
| 7,679,518 B1 * | 3/2010 | Pabla et al. ................ | 340/573.1 |
| 8,023,437 B1 * | 9/2011 | Chapweske et al. .......... | 370/261 |
| 2004/0246331 A1 | 12/2004 | Caspi et al. | |
| 2006/0146124 A1 | 7/2006 | Pepperell et al. | |

* cited by examiner

*Primary Examiner* — Thai Tran
*Assistant Examiner* — Mishawn Dunn

(57) ABSTRACT

Apparatus having corresponding computer-readable media comprises: a recording module adapted to record audio and video streams of a videoconference; a storage module adapted to store a media file associated with the videoconference; and a command module adapted to generate a command file comprising records for events that occur during the videoconference, wherein at least one of the records comprises a time of occurrence in the videoconference of an event associated with the media file, and a reference to the media file.

24 Claims, 19 Drawing Sheets

Raw Command File *412*
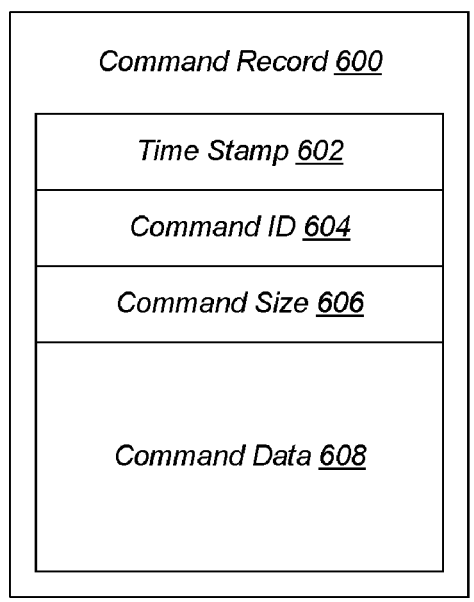
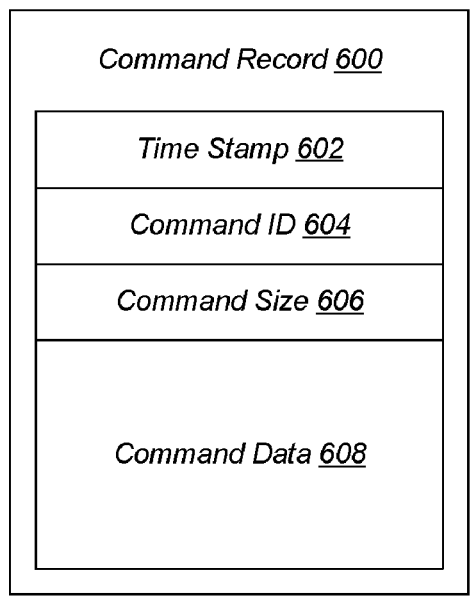
⋮
FIG. 6

Media Item List 1200

| Media Record 1202 |
| :---: |
| Time Stamp 1204 |
| Description 1206 |
| Pages 1208 |
| Filename 1210 |
| File Size 1212 |
| Last Modified 1214 |
| Media ID 1216 |
| Media Type 1218 |
| Owner ID 1220 |
| URLs 1222 |

⋮

VIDEOCONFERENCE RECORDING, POST-PROCESSING, AND PLAYBACK

BACKGROUND

The present invention relates generally to videoconference recording, post-processing, and playback. More particularly, the present invention relates to recording, post-processing, and playback of videoconferences including media files.

Videoconferencing is becoming an essential tool within many corporations for sharing and distributing information. These online meetings can take many forms such as company-wide announcements, technical discussions between engineering groups, training seminars, code reviews, and the like. As much corporate content is moved online and transmitted through videoconferences, there is an opportunity to manage the content to better advantage.

With many current communication technologies, such as email and instant messaging, a record of the communication with others can be easily saved for future reference. Unfortunately, the data that flows through videoconference systems is generally not saved, so participants have no way to record what took place in a videoconference other than by taking notes, which is not much of an improvement over the conventional face-to-face meeting.

SUMMARY

In general, in one aspect, the invention features computer-readable media embodying instructions executable by a computer to perform a method comprising: recording audio and video streams of a videoconference; storing a media file associated with the videoconference; and generating a command file comprising records for events that occur during the videoconference, wherein at least one of the records comprises a time of occurrence in the videoconference of an event associated with the media file, and a reference to the media file.

In some embodiments, the media file represents at least one of: a document; and an image. In some embodiments, the event associated with the media file represents at least one of: adding the media file to the videoconference. In some embodiments, the records comprise at least one of: a record regarding a participant of the videoconference; a record regarding an annotation of the media file; and a record regarding a streaming sideband media session of the videoconference.

In general, in one aspect, the invention features an apparatus comprising: a recording module adapted to record audio and video streams of a videoconference; a storage module adapted to store a media file associated with the videoconference; and a command module adapted to generate a command file comprising records for events that occur during the videoconference, wherein at least one of the records comprises a time of occurrence in the videoconference of an event associated with the media file, and a reference to the media file.

In some embodiments, the media file represents at least one of: a document; and an image. In some embodiments, the event associated with the media file represents at least one of: adding the media file to the videoconference. In some embodiments, the records comprise at least one of: a record regarding a participant of the videoconference; a record regarding an annotation of the media file; and a record regarding a streaming sideband media session of the videoconference.

In general, in one aspect, the invention features computer-readable media embodying instructions executable by a computer to perform a method comprising: receiving a videoconference recording comprising a recording of audio and video streams of the videoconference, a media file associated with the videoconference, and a command file comprising first records for events that occur during the videoconference, wherein at least one of the first records comprises a time of occurrence in the videoconference of an event associated with the media file, and a reference to the media file; and generating a media index file comprising one or more second records each comprising a reference to one of the first records, and the time of occurrence in the videoconference of the event represented by the one of the first records; wherein the second records are arranged in the media index file according to the times of occurrence of the events.

In some embodiments, the media file represents at least one of: a document; and an image. In some embodiments, the event associated with the media file represents at least one of: adding the media file to the videoconference. In some embodiments, the records comprise at least one of: a record regarding a participant of the videoconference; a record regarding an annotation of the media file; and a record regarding a streaming sideband media session of the videoconference.

In general, in one aspect, the invention features an apparatus comprising: an input module adapted to receive a videoconference recording comprising a recording of audio and video streams of the videoconference, a media file associated with the videoconference, and a command file comprising first records for events that occur during the videoconference, wherein at least one of the first records comprises a time of occurrence in the videoconference of an event associated with the media file, and a reference to the media file; and an index module adapted to generate a media index file comprising one or more second records each comprising a reference to one of the first records, and the time of occurrence in the videoconference of the event represented by the one of the first records; wherein the second records are arranged in the media index file according to the times of occurrence of the events.

In some embodiments, the media file represents at least one of: a document; and an image. In some embodiments, the event associated with the media file represents at least one of: adding the media file to the videoconference. In some embodiments, the records comprise at least one of: a record regarding a participant of the videoconference; a record regarding an annotation of the media file; and a record regarding a streaming sideband media session of the videoconference.

In general, in one aspect, the invention features computer-readable media embodying instructions executable by a computer to perform a method comprising: receiving a post-processed videoconference recording comprising a recording of audio and video streams of the videoconference, a media file associated with the videoconference, a command file comprising first records for events that occur during the videoconference, wherein at least one of the records comprises a time of occurrence in the videoconference of an event associated with the media file, and a reference to the media file, and a media index file comprising one or more second records each comprising a reference to one of the first records, and the time of occurrence in the videoconference of the event represented by the one of the first records, wherein the second records are arranged in the media index file according to the times of occurrence of the events; receiving a seek time for beginning playback of the post-processed videoconference recording; and playing the videoconference starting at the seek time, comprising searching the media index file for a second record preceding the seek time, identifying the first record referenced by the second record, transmitting the first record, and playing the audio and video streams of the videoconference starting at the seek time in the videoconference.

In some embodiments, the media file represents at least one of: a document; and an image. In some embodiments, the event associated with the media file represents at least one of: adding the media file to the videoconference. In some embodiments, the records comprise at least one of: a record regarding a participant of the videoconference; a record regarding an annotation of the media file; and a record regarding a streaming sideband media session of the videoconference.

In general, in one aspect, the invention features an apparatus comprising: a recording input module adapted to receive a post-processed videoconference recording comprising a recording of audio and video streams of the videoconference, a media file associated with the videoconference, a command file comprising first records for events that occur during the videoconference, wherein at least one of the records comprises a time of occurrence in the videoconference of an event associated with the media file, and a reference to the media file, and a media index file comprising one or more second records each comprising a reference to one of the first records, and the time of occurrence in the videoconference of the event represented by the one of the first records, wherein the second records are arranged in the media index file according to the times of occurrence of the events; a seek input module adapted to receive a seek time for beginning playback of the post-processed videoconference recording; and a playback module adapted to play the videoconference starting at the seek time, comprising a search module adapted to search the media index file for a second record preceding the seek time, a select module adapted to identify the first record referenced by the second record, a transmit module adapted to transmit the first record, and a play module adapted to play the audio and video streams of the videoconference starting at the seek time in the videoconference.

In some embodiments, the media file represents at least one of: a document; and an image. In some embodiments, the event associated with the media file represents at least one of: adding the media file to the videoconference. In some embodiments, the records comprise at least one of: a record regarding a participant of the videoconference; a record regarding an annotation of the media file; and a record regarding a streaming sideband media session of the videoconference.

In general, in one aspect, the invention features a method comprising: recording audio and video streams of a videoconference; storing a media file associated with the videoconference; and generating a command file comprising records for events that occur during the videoconference, wherein at least one of the records comprises a time of occurrence in the videoconference of an event associated with the media file, and a reference to the media file.

In some embodiments, the media file represents at least one of: a document; and an image. In some embodiments, the event associated with the media file represents at least one of: adding the media file to the videoconference. In some embodiments, the records comprise at least one of: a record regarding a participant of the videoconference; a record regarding an annotation of the media file; and a record regarding a streaming sideband media session of the videoconference.

In general, in one aspect, the invention features an apparatus comprising: recording means for recording audio and video streams of a videoconference; storage means for storing a media file associated with the videoconference; and command means for generating a command file comprising records for events that occur during the videoconference, wherein at least one of the records comprises a time of occurrence in the videoconference of an event associated with the media file, and a reference to the media file.

In some embodiments, the media file represents at least one of: a document; and an image. In some embodiments, the event associated with the media file represents at least one of: adding the media file to the videoconference. In some embodiments, the records comprise at least one of: a record regarding a participant of the videoconference; a record regarding an annotation of the media file; and a record regarding a streaming sideband media session of the videoconference.

In general, in one aspect, the invention features a method comprising: receiving a videoconference recording comprising a recording of audio and video streams of the videoconference, a media file associated with the videoconference, and a command file comprising first records for events that occur during the videoconference, wherein at least one of the first records comprises a time of occurrence in the videoconference of an event associated with the media file, and a reference to the media file; and generating a media index file comprising one or more second records each comprising a reference to one of the first records, and the time of occurrence in the videoconference of the event represented by the one of the first records; wherein the second records are arranged in the media index file according to the times of occurrence of the events.

In some embodiments, the media file represents at least one of: a document; and an image. In some embodiments, the event associated with the media file represents at least one of: adding the media file to the videoconference. In some embodiments, the records comprise at least one of: a record regarding a participant of the videoconference; a record regarding an annotation of the media file; and a record regarding a streaming sideband media session of the videoconference.

In general, in one aspect, the invention features an apparatus comprising: input means for receiving a videoconference recording comprising a recording of audio and video streams of the videoconference, a media file associated with the videoconference, and a command file comprising first records for events that occur during the videoconference, wherein at least one of the first records comprises a time of occurrence in the videoconference of an event associated with the media file, and a reference to the media file; and index means for generating a media index file comprising one or more second records each comprising a reference to one of the first records, and the time of occurrence in the videoconference of the event represented by the one of the first records; wherein the second records are arranged in the media index file according to the times of occurrence of the events.

In some embodiments, the media file represents at least one of: a document; and an image. In some embodiments, the event associated with the media file represents at least one of: adding the media file to the videoconference. In some embodiments, the records comprise at least one of: a record regarding a participant of the videoconference; a record regarding an annotation of the media file; and a record regarding a streaming sideband media session of the videoconference.

In general, in one aspect, the invention features a method comprising: receiving a post-processed videoconference recording comprising a recording of audio and video streams of the videoconference, a media file associated with the videoconference, a command file comprising first records for events that occur during the videoconference, wherein at least one of the records comprises a time of occurrence in the videoconference of an event associated with the media file, and a reference to the media file, and a media index file comprising one or more second records each comprising a reference to one of the first records, and the time of occurrence in the videoconference of the event represented by the one of the first records, wherein the second records are arranged in the media index file according to the times of occurrence of the events; receiving a seek time for beginning playback of the post-processed videoconference recording; and playing the videoconference starting at the seek time, comprising searching the media index file for a second record preceding the seek time, identifying the first record referenced by the second record, transmitting the first record, and playing the audio and video streams of the videoconference starting at the seek time in the videoconference.

In some embodiments, the media file represents at least one of: a document; and an image. In some embodiments, the event associated with the media file represents at least one of: adding the media file to the videoconference. In some embodiments, the records comprise at least one of: a record regarding a participant of the videoconference; a record regarding an annotation of the media file; and a record regarding a streaming sideband media session of the videoconference.

In general, in one aspect, the invention features an apparatus comprising: recording input means for receiving a post-processed videoconference recording comprising a recording of audio and video streams of the videoconference, a media file associated with the videoconference, a command file comprising first records for events that occur during the videoconference, wherein at least one of the records comprises a time of occurrence in the videoconference of an event associated with the media file, and a reference to the media file, and a media index file comprising one or more second records each comprising a reference to one of the first records, and the time of occurrence in the videoconference of the event represented by the one of the first records, wherein the second records are arranged in the media index file according to the times of occurrence of the events; seek input means for receiving a seek time for beginning playback of the post-processed videoconference recording; and playback means for playing the videoconference starting at the seek time, comprising search means for searching the media index file for a second record preceding the seek time, select means for identifying the first record referenced by the second record, transmit means for transmitting the first record, and play means for playing the audio and video streams of the videoconference starting at the seek time in the videoconference.

In some embodiments, the media file represents at least one of: a document; and an image. In some embodiments, the event associated with the media file represents at least one of: adding the media file to the videoconference. In some embodiments, the records comprise at least one of: a record regarding a participant of the videoconference; a record regarding an annotation of the media file; and a record regarding a streaming sideband media session of the videoconference.

The details of one or more implementations are set forth in the accompanying drawings and the description below. Other features will be apparent from the description and drawings, and from the claims.

DESCRIPTION OF DRAWINGS

FIG. 6 shows the format of the records in a raw command file according to an embodiment of the present invention.

Figure 1:
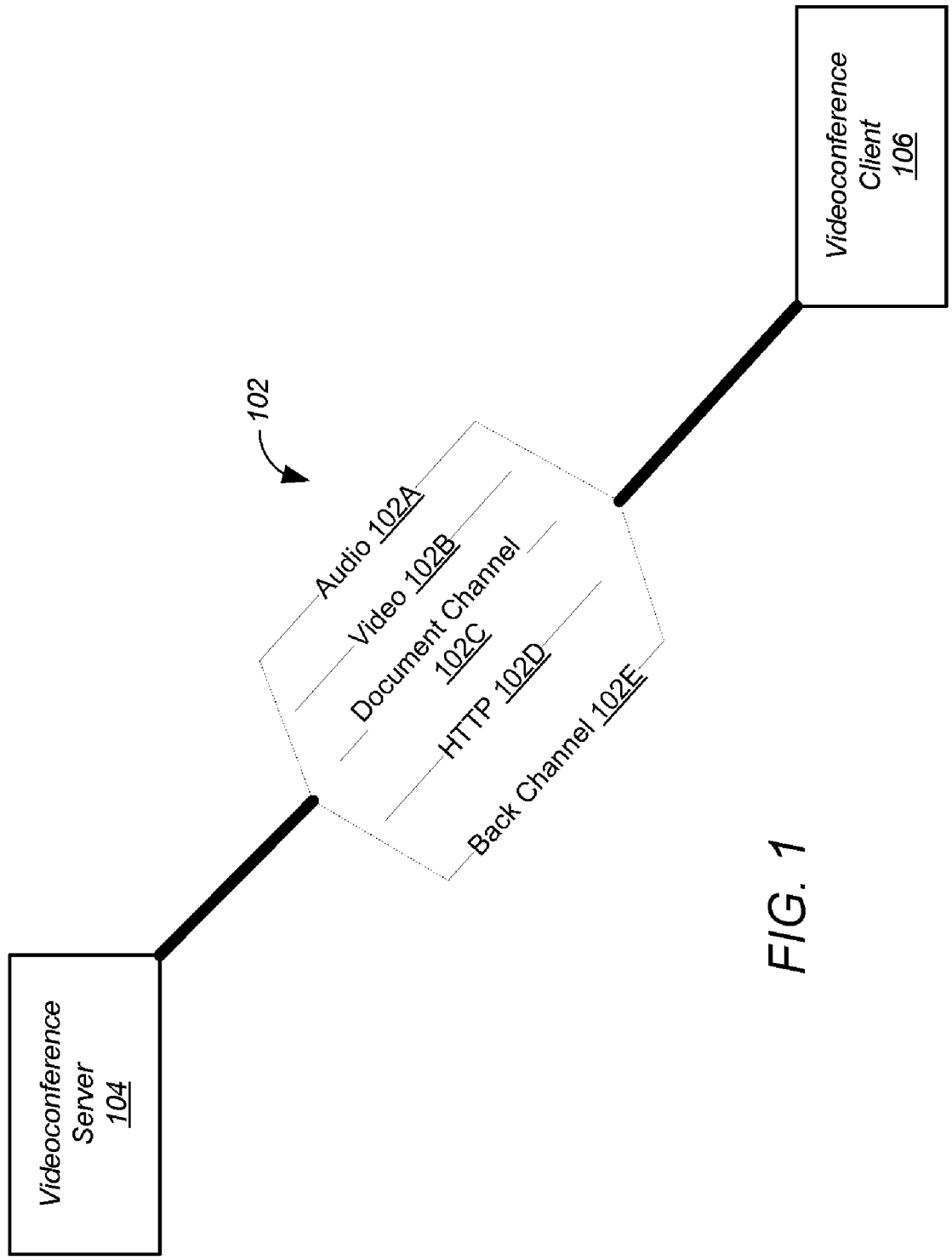
FIG. 1 shows the logical connections between a videoconference client and a videoconference server according to an embodiment of the present invention.

The leading digit(s) of each reference numeral used in this specification indicates the number of the drawing in which the reference numeral first appears.

DETAILED DESCRIPTION

As used herein, the terms "client" and "server" generally refer to an electronic device or mechanism, and the term "message" generally refers to an electronic signal representing a digital message. As used herein, the term "mechanism" refers to hardware, software, or any combination thereof. These terms are used to simplify the description that follows. The clients, servers, and mechanisms described herein can be implemented on any standard general-purpose computer, or can be implemented as specialized devices.

Embodiments of the present invention provide videoconference systems that save all of the data that flows through the videoconference server during a videoconference to create an intelligent archive that can be recalled long after the videoconference has concluded. These videoconference systems provide recording, post-processing, and playback of videoconferences.

A videoconference client maintains a number of connections to the videoconference server during a videoconference meeting. FIG. 1 shows the logical connections 102 between a videoconference client 106 and a videoconference server 104 according to an embodiment of the present invention. Separate connections 102 are established including an audio connection 102A, a video connection 102B, a document channel connection 102C, an HTTP connection 102D, and a back channel connection 102E. The connection 102 established first is document channel connection 102C, which handles authentication, requests, meeting events and data transfer.

Once document channel connection 102C is established and the user of videoconference client 106 is authenticated to join a videoconference, audio and video connections 102A,B are established. To support video and audio processing on videoconference server 104, back channel connection 102E is also established. Back channel connection 102E communicates video layout changes, other video events, and the like, between videoconference client 106 and videoconference server 104.

Document channel connection 102C is established as needed to support meeting events. Meeting events can include participants events, media events, sideband stream events, annotation events, and the like. Participant events can include events where participants join and leave the videoconference, and the like. Media events can include transferring media files to be shared within the videoconference. The media files can include documents, images, and the like such as word processing files and drawing files. Sideband stream events can include starting and ending sideband streaming sessions for sharing applications, sharing video captured by a document camera, and the like. Annotation events can include participants making annotations of a whiteboard, application image, and the like.

All non-video/audio data streams and files are handled by document channel connection 102C and HTTP connection 102D. For example, when a user adds media, such as a document or image, to the videoconference, a media add command is sent to all videoconference clients over document channel connection 102C. The body of the media add command contains a URL for the media, which is stored on videoconference server 104. In response, each videoconference client 106 establishes an HTTP connection 102D with videoconference server 104 to download the media.

Figure 2:
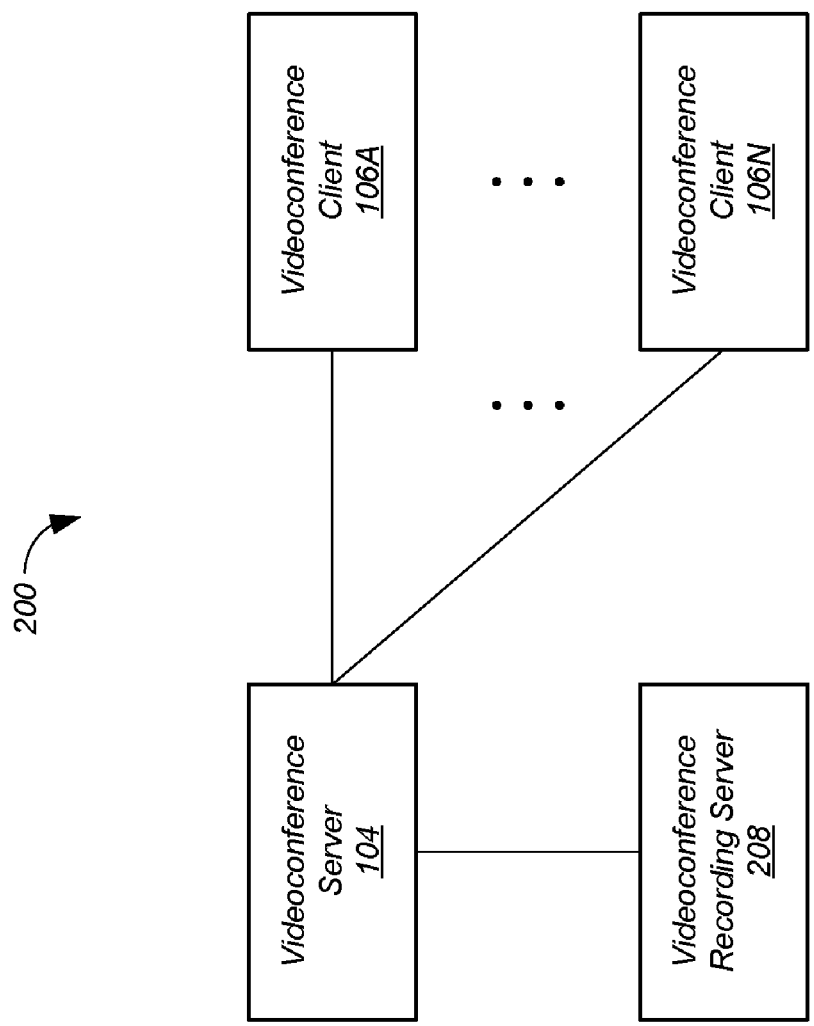
FIG. 2 shows a videoconference recording system according to an embodiment of the present invention.

FIG. 2 shows a videoconference recording system 200 according to an embodiment of the present invention. Videoconference recording system 200 includes one or more videoconference clients 106A-N, a videoconference server 104, and a videoconference recording server 208. To record a videoconference, videoconference recording server 208 connects to videoconference server 104 in the same manner as a videoconference client 106, with the same logical connections 102. To videoconference server 104, videoconference recording server 208 appears the same as a videoconference client 106.

Figure 3:
FIG. 3 shows detail of a videoconference recording server according to an embodiment of the present invention.

FIG. 3 shows detail of videoconference recording server 208 according to an embodiment of the present invention. Referring to FIG. 3, videoconference recording server 208 includes a videoconference recording module 302 adapted to generate a raw videoconference recording 304, a videoconference post-processing module 306 adapted to generate a post-processed videoconference recording 308 based on raw videoconference recording 304, and a videoconference playback module 310 to play back a recorded videoconference based on post-processed videoconference recording 308.

Although in the described embodiments, the elements of videoconference recording server 208 are presented in one arrangement, other embodiments may feature other arrangements, as will be apparent to one skilled in the relevant arts based on the disclosure and teachings provided herein. For example, the elements of videoconference recording server 208 can be implemented in hardware, software, or combinations thereof.

Figure 4:
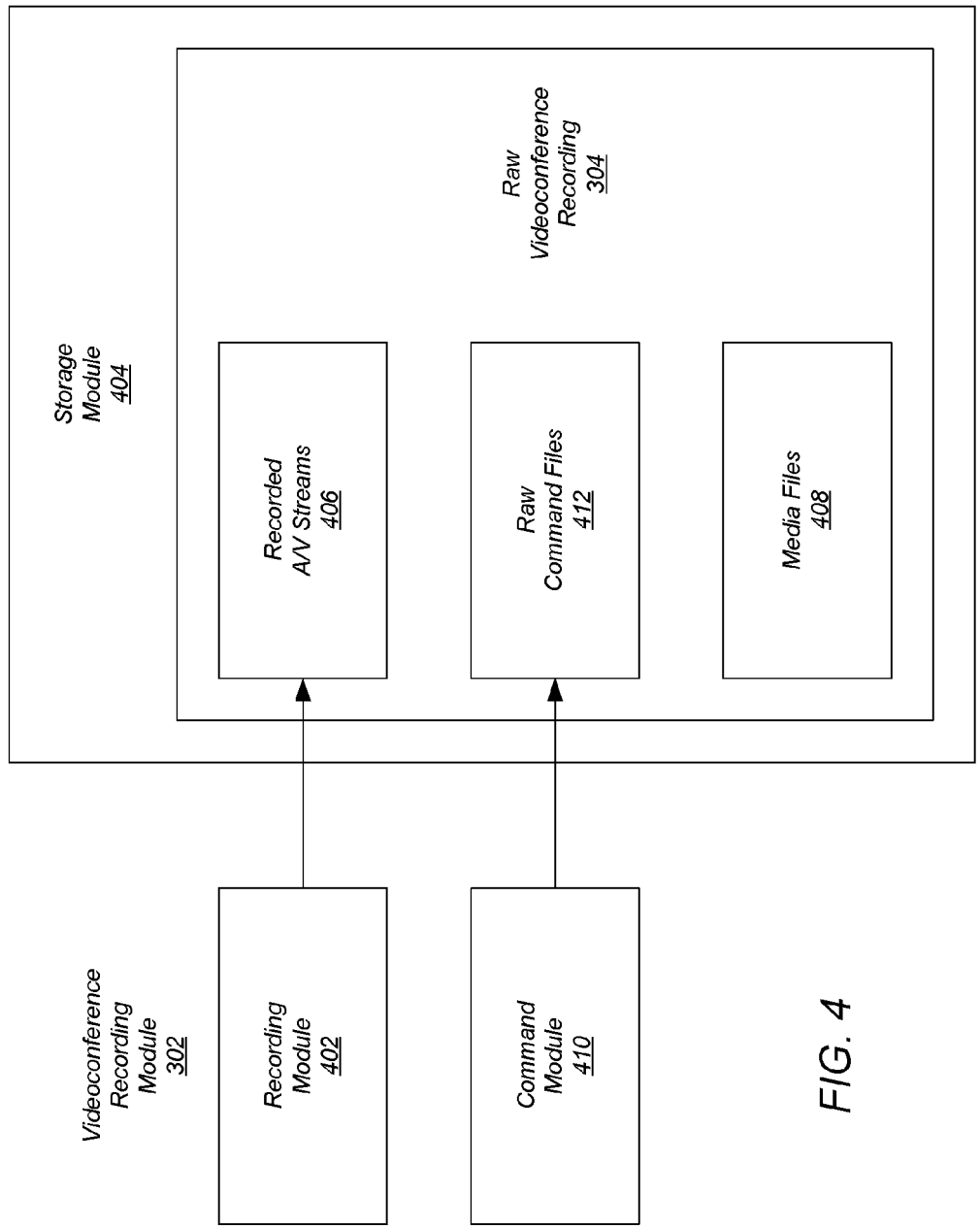
FIG. 4 shows detail of a videoconference recording module according to an embodiment of the present invention.

FIG. 4 shows detail of videoconference recording module 302 of FIG. 3 according to an embodiment of the present invention. Referring to FIG. 4, videoconference recording module 302 includes a recording module 402 adapted to record audio and video streams of videoconferences; a storage module 404 adapted to store the recorded audio and video (A/V) streams 406, media files 408 associated with videoconferences, and the like; and a command module 410 adapted to generate a raw command file 412 for each recorded videoconference. Raw command files 412 are stored on storage module 404. Each raw command file 412 includes records for events that occur during a videoconference. For example, for a media load command, the record includes a time of occurrence in the videoconference of an event associated with the media file, and a reference to the media file. Together the recorded A/V streams 406 for a videoconference, media files 408 associated with the videoconference, and the raw command file 412 for the videoconference comprise a raw videoconference recording 304 of the videoconference.

Figure 5:
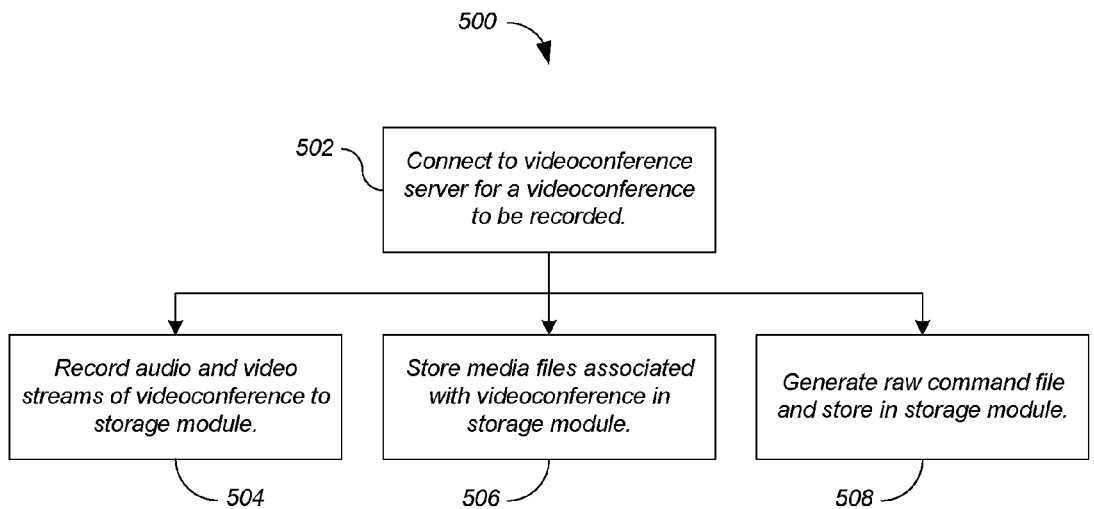
FIG. 5 shows a process for the videoconference recording module of FIG. 4 according to an embodiment of the present invention.

FIG. 5 shows a process 500 for videoconference recording module 302 of FIG. 4 according to an embodiment of the present invention. Although in the described embodiments, the elements of process 500 are presented in one arrangement, other embodiments may feature other arrangements, as will be apparent to one skilled in the relevant arts based on the disclosure and teachings provided herein. For example, in various embodiments, some or all of the steps of process 500 can be executed in a different order, concurrently, and the like.

Referring to FIG. 5, videoconference recording server 208 connects to videoconference server 104 for a videoconference to be recorded (step 502). During the videoconference, videoconference recording server 208 generates a raw videoconference recording 304. In particular, videoconference recording module 302 records the audio and video streams 406 of the videoconference to storage module 404 (step 504). Videoconference recording server 208 stores media files 408 associated with the videoconference in storage module 404 as well (step 506). Command module 410 generates raw command file 412, which is also stored in storage module 404 (step 508). Command module 410 generates a record in raw command file 412 for each event that occurs during the corresponding videoconference.

FIG. 6 shows the format of the records 600 in raw command file 412 according to an embodiment of the present invention. Referring to FIG. 6, each record 600 includes a time stamp 602 that indicates a time of occurrence in the videoconference of the respective command. The time of occurrence can represent the time at which the command was generated, transmitted, received, and the like. Each record 600 also includes a command ID 604 that identifies the type of command, a command size 606 that indicates the size of the command, and command data 608 that includes data associated with the command.

If the recorded videoconference were simply to be played back from start to finish, very little post-processing would be required. The events in raw command file 412 could be replayed as they arrived during the original videoconference.

But to support the ability to seek to any point in the videoconference, raw videoconference recording 304 is processed to create index file and data files that allow a playback client to seek to any time in the videoconference and to begin viewing the recorded videoconference from that point.

Figure 7:
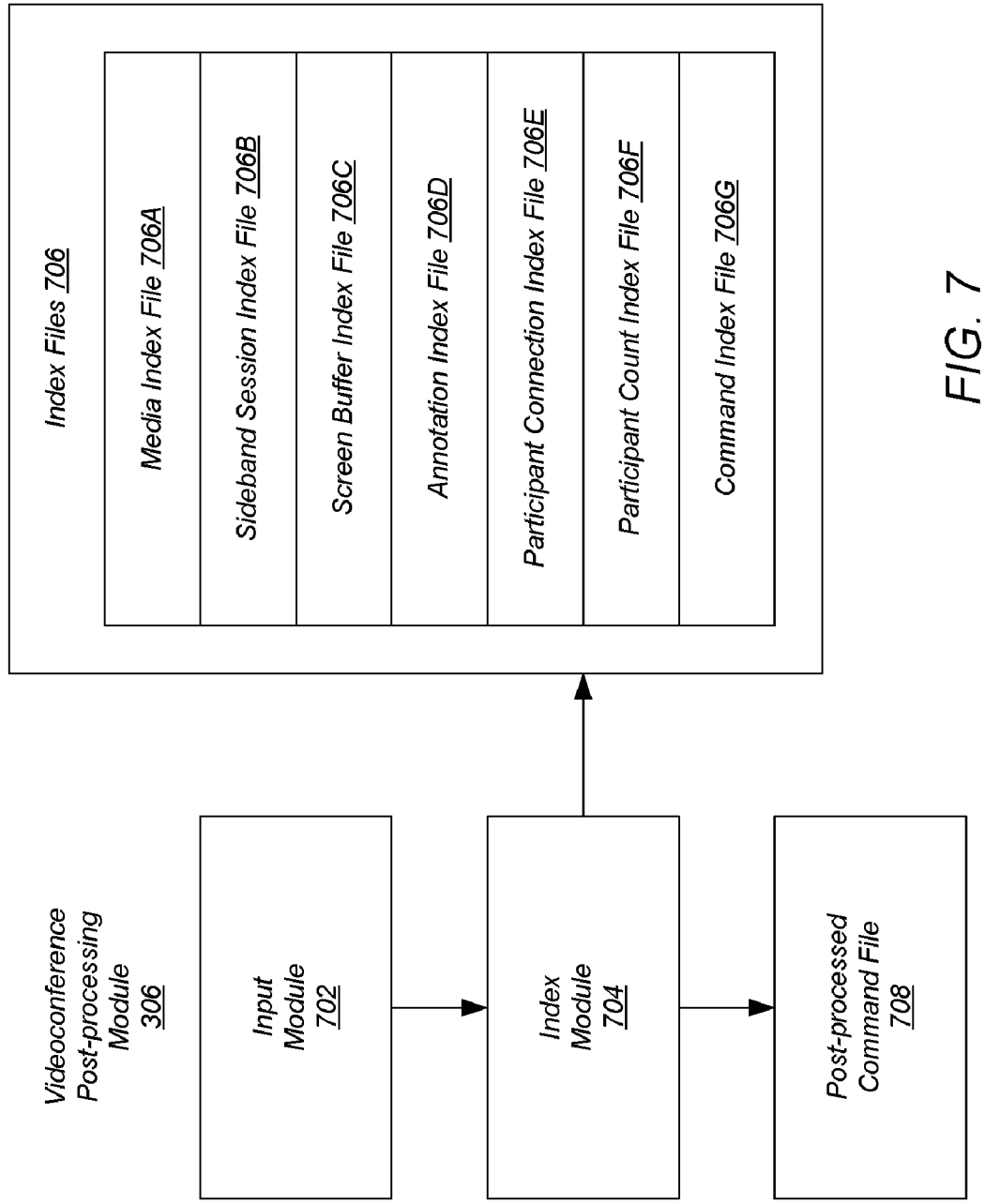
FIG. 7 shows detail of the videoconference post-processing module of FIG. 3 according to an embodiment of the present invention.

FIG. 7 shows detail of videoconference post-processing module 306 of FIG. 3 according to an embodiment of the present invention. Referring to FIG. 7, videoconference post-processing module 306 includes an input module 702 adapted to receive a raw videoconference recording 304 from videoconference recording module 302. Referring again to FIG. 4, raw videoconference recording 304 can include recorded A/V streams 406 for the videoconference, a raw command file 412 for the videoconference, and one or more media files 408 associated with the videoconference.

Referring again to FIG. 7, videoconference post-processing module 306 also includes an index module 704 adapted to generate a post-processed videoconference recording 308 based on each raw videoconference recording 304. Post-processed videoconference recording 308 includes a post-processed command file 708 and one or more index files 706 for each raw videoconference recording 304. Post-processed videoconference recording 308 can include other sorts of files as well, as described below. Index files 706 can include a media index file 706A, a sideband session index file 706B, a screen buffer index file 706C, an annotation index file 706D, a participant connection index file 706E, a participant count index file 706F, and a command index file 706G. Index module 704 processes raw command file 412 in one pass with various handlers called depending on the type of command to be processed. Commands to be used for playback are written to a new post-processed command file 708. Some commands in raw command file 412 are not needed during playback, and so are not included in post-processed command file 708, as described below.

Figure 8:
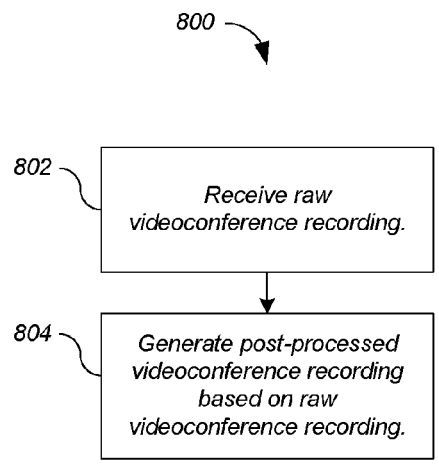
FIG. 8 shows a process for the videoconference post-processing module of FIG. 7 according to an embodiment of the present invention.

FIG. 8 shows a process 800 for videoconference post-processing module 306 of FIG. 7 according to an embodiment of the present invention. Although in the described embodiments, the elements of process 800 are presented in one arrangement, other embodiments may feature other arrangements, as will be apparent to one skilled in the relevant arts based on the disclosure and teachings provided herein. For example, in various embodiments, some or all of the steps of process 800 can be executed in a different order, concurrently, and the like.

Referring to FIG. 8, input module 702 of videoconference post-processing module 306 receives a raw videoconference recording 304 (step 802). Referring again to FIG. 4, raw videoconference recording 304 can include recorded A/V streams 406 for the videoconference, a raw command file 412 for the videoconference, and one or more media files 408 associated with the videoconference.

Referring again to FIG. 8, index module 704 generates a post-processed videoconference recording 308 based on raw videoconference recording 304 (step 804). As described above, post-processed videoconference recording 308 includes a post-processed command file 708 and one or more index files 706, and can include other sorts of files as well.

In some embodiments, videoconference recording system 200 allows videoconference clients 106 to share information using sideband streaming sessions. For example, a sideband streaming session can be used to share applications, to share paper documents using a document camera, and the like. Post-processing of an application sharing session is now described. However, this description is applicable to other sorts of sideband streaming sessions.

In an application sharing session, screen updates are sent over time as areas on the screen change. That is, a videoconference client 106 sharing an application sends screen updates as they occur. Videoconference server 104 then sends these region updates on to other connected videoconference clients 106. Depending on the size of the update region, the updates can be sent in a chain with designations for first, middle or last blocks. At other times only a single block is sent with a corresponding designation. Cursor move messages are also transmitted so other videoconference clients 106 can update the position of the cursor in the screen.

Videoconference server 104 maintains a screen buffer for each application sharing session, and updates the screen buffer as the screen updates are received. When a new videoconference client 106 joins a videoconference during an application sharing session, videoconference server 104 sends the latest screen buffer to the new videoconference client 106 followed by the ensuing screen updates. Without the screen buffer, videoconference server 104 would have to send all of the previous screen updates to the new videoconference client 106.

Videoconference recording server 208 handles sideband sharing sessions in a similar manner. However, instead of creating screen buffers during recording of the videoconference, videoconference recording server 208 creates screen buffers during the post-processing phase. During post-processing, videoconference post-processing module 306 scans raw command file 412 for sideband session commands. These sideband session commands generally include session start commands, session end commands, screen data commands, cursor move commands, and the like. Based on these sideband session commands, index module 704 creates a sideband session index file.

Figure 9:
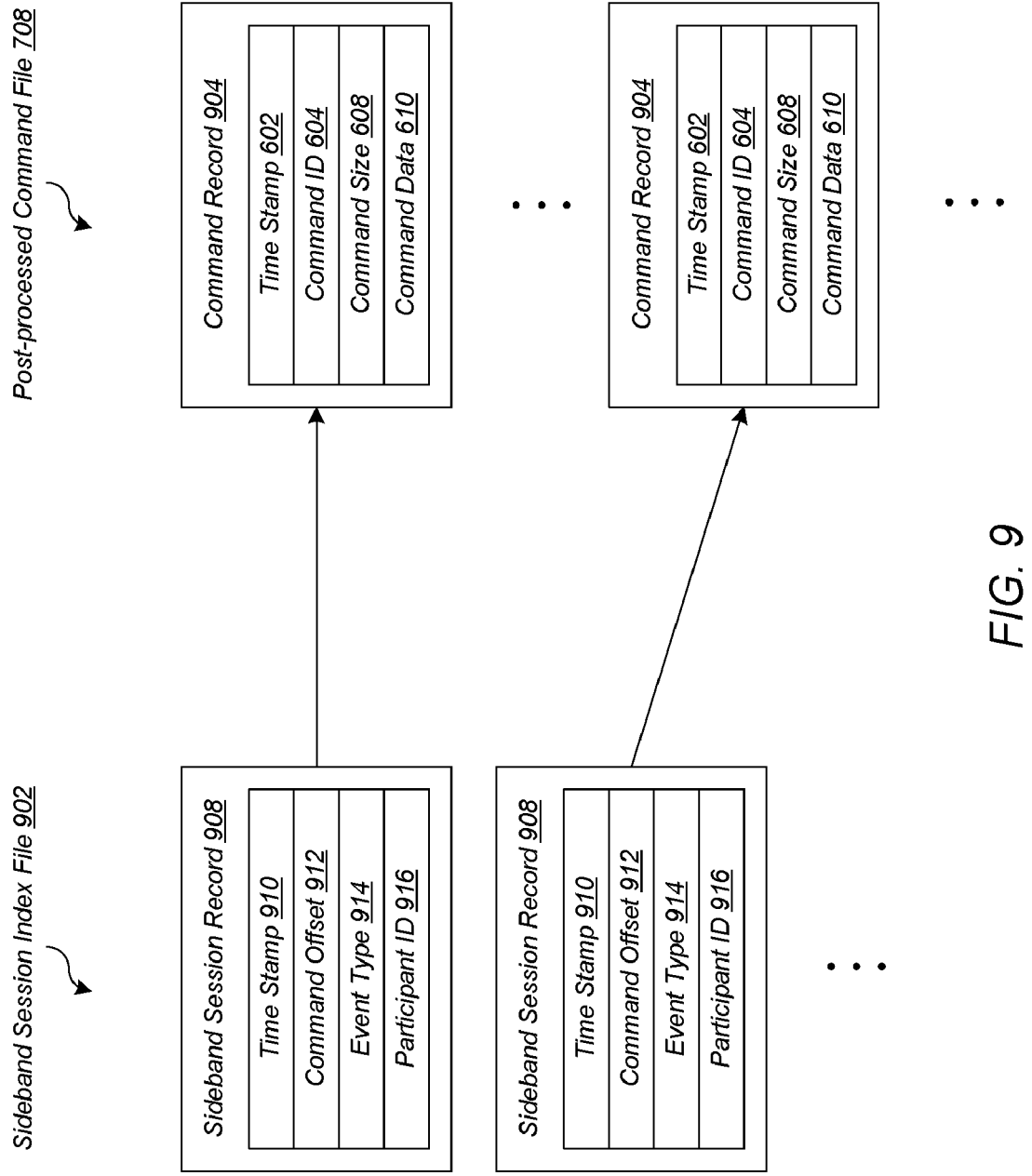
FIG. 9 shows portions of a sideband session index file and a post-processed command file for a recorded videoconference according to an embodiment of the present invention.

FIG. 9 shows portions of a sideband session index file 902 and a post-processed command file 708 for a recorded videoconference according to an embodiment of the present invention. Post-processed command file 708 includes a plurality of command records 904, which can have the same format as records 600 in raw command file 412. Sideband session index file 902 includes a sideband session record 908 for each sideband session command in post-processed command file 708, as well as a reference to the sideband session command in the form of a pointer or the like. Each sideband session record 908 includes a time stamp 910 indicating a time of occurrence of the command, a command offset 912 indicating an offset of the command into post-processed command file 708, an event type 914 indicating the type of event indicated by the command, and a participant ID 916 indicating the participant responsible for the command.

Command records 904 are arranged in chronological order in post-processed command file 708. Sideband session records 908 are also arranged in chronological order in sideband session index file 902, which allows videoconference playback module 310 (FIG. 3) to quickly determine if an application sharing session is in progress during a requested seek time.

Index module 704 also generates application sharing screen buffers so that a client seeking to a point in the recorded videoconference does not require all of the screen updates from the start of the videoconference. The screen buffers are generated frequently enough such that after a screen update is sent to a videoconference client 106, only a small number of subsequent screen updates are required to bring the playback up to the desired seek time. Index module 704 also generates a screen buffer index file to point to the screen buffers, and to corresponding commands in post-processed command file 708.

Figure 10:
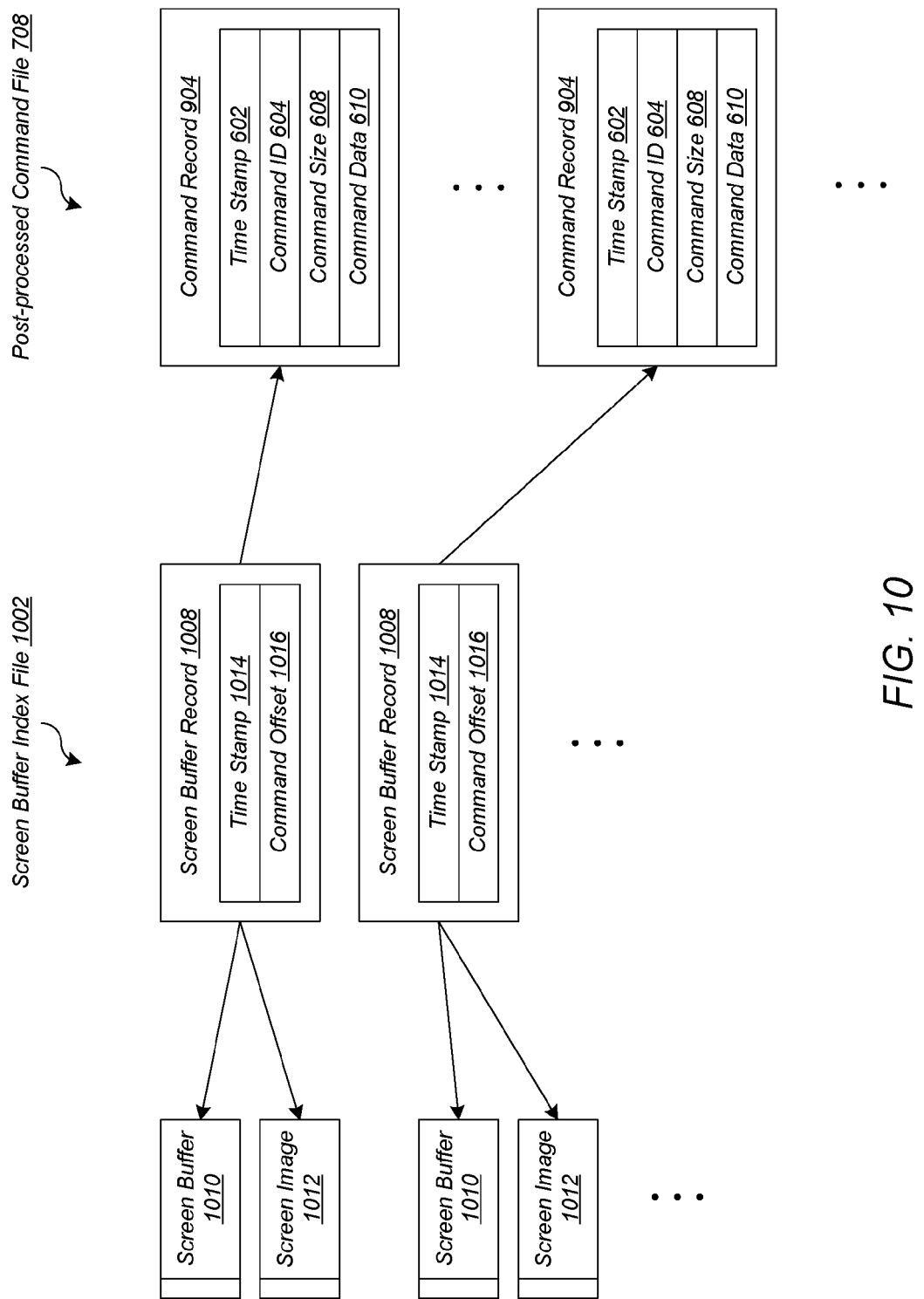
FIG. 10 shows portions of a screen buffer index file and a post-processed command file for a recorded videoconference according to an embodiment of the present invention.

FIG. 10 shows portions of a screen buffer index file 1002 and a post-processed command file 708 for a recorded videoconference according to an embodiment of the present invention. Post-processed command file 708 includes a plurality of command records 904, which can have the same format as records 600 in raw command file 412. Screen buffer index file 1002 includes a screen buffer record 1008 for each screen buffer 1010 and its associated screen image 1012. Each screen buffer 1010 contains both command and image data for updating the sideband session screen region on videoconference clients 106. Each screen image 1012 contains image data of the full screen region.

Each screen buffer record 1008 includes a time stamp 1014 and a command offset 1016 indicating an offset of the command into post-processed command file 708, and has pointers to the associated screen buffer 1010, screen image 1012, and command record 904 in post-processed command file 708. Screen buffer records 1008 are arranged in chronological order in screen buffer index file 1002 to facilitate seek operations, as described below.

Videoconference client 106 can provide tools for the user to annotate images such as whiteboards, slides, and the like. Annotations can include text, lines, objects, and the like with attributes such as color, size, transparency, and the like. When a user creates an annotation, videoconference client 106 sends a command on document channel connection 102C to videoconference server 104, which distributes the command to all the connected videoconference clients 106. Included in the command is a media ID that designates the media item to which the annotation belongs. Each videoconference client 106 then updates the designated media item with the latest annotation. During the recording process, videoconference recording module 302 saves all annotation-related commands to raw command file 412.

Figure 11:
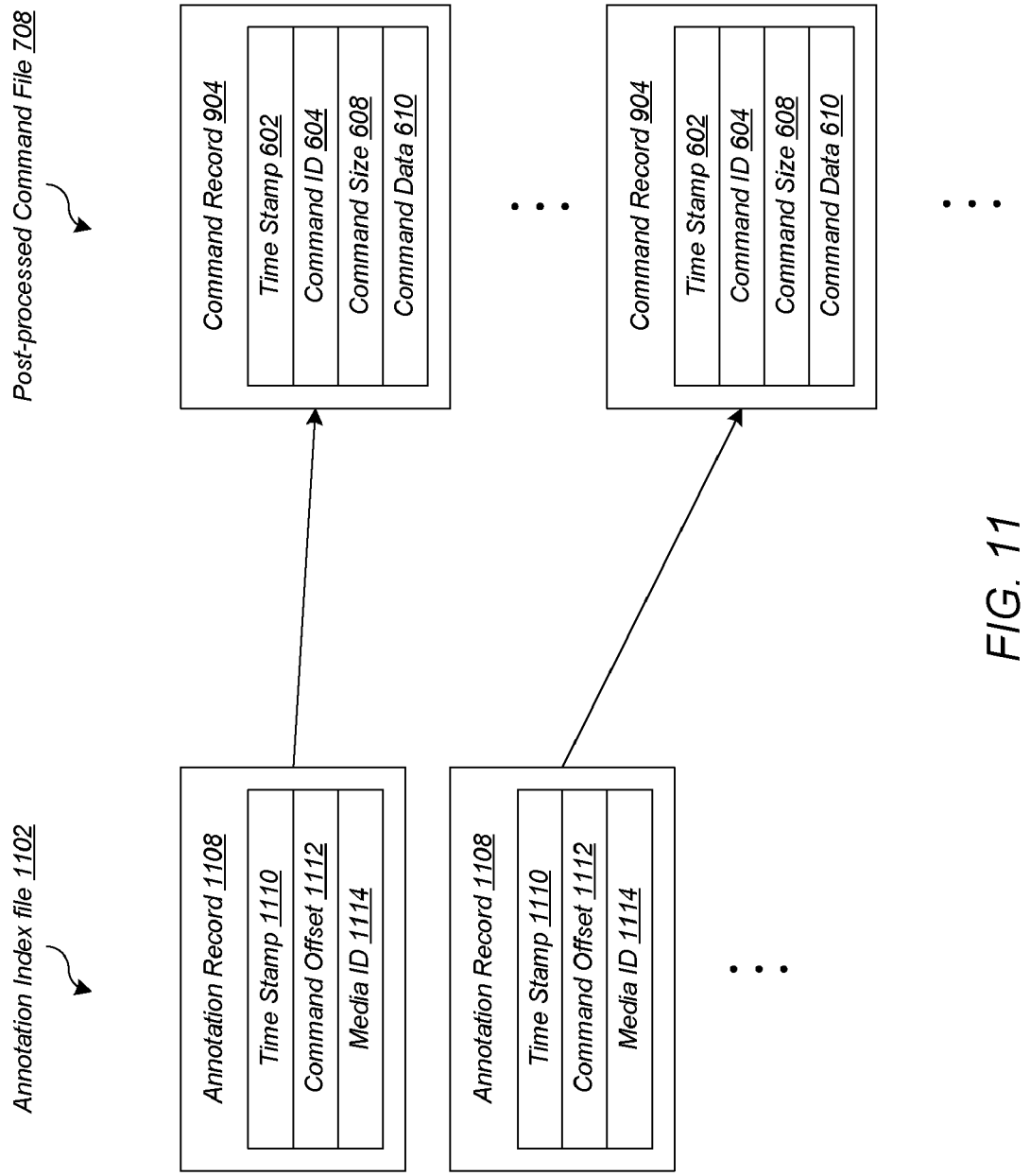
FIG. 11 shows portions of an annotation index file and a post-processed command file for a recorded videoconference according to an embodiment of the present invention.

In the post-processing phase, videoconference post-processing module 306 creates an annotation index file. FIG. 11 shows portions of an annotation index file 1102 and a post-processed command file 708 for a recorded videoconference according to an embodiment of the present invention. Post-processed command file 708 includes a plurality of command records 904, which can have the same format as records 600 in raw command file 412. Annotation index file 1102 includes an annotation record 1108 for each annotation command in post-processed command file 708, as well as a reference to the corresponding annotation command in post-processed command file 708 in the form of a pointer or the like. Each annotation record 1108 includes a time stamp 1110 indicating a time of occurrence of the command, a command offset 1112 indicating an offset of the command into post-processed command file 708, and a media ID 1114 indicating the media associated with the annotation command. Annotation records 1108 are arranged in chronological order in annotation index file 1102 to facilitate seek operations, as described below.

Because annotation commands contain much less data than application sharing commands, a screen buffer is not required. During a seek operation, videoconference recording server 208 re-sends all previous annotation commands up to the desired seek time for all media active in the meeting at the seek time. Annotation index file 1102 can be used to quickly identify annotation commands for each media item to avoid reading the entirety of post-processed command file 708.

During the course of a videoconference, users can add new media such as whiteboard, images, documents, slides, and the like. When a media item is added to the videoconference, videoconference server 104 sends a media change command to all the videoconference clients 106. For items such as images and documents, the videoconference clients 106 use the HTTP protocol to download the media items from videoconference server 104.

Videoconference post-processing module 306 creates a media index file, as described below, that enables videoconference playback module 310 to quickly determine which media items are active at a given seek time in the videoconference. These new media commands are not copied from raw command file 412 to post-processed command file 708. Instead, when a videoconference client 106 connects to videoconference recording server 208 to play back a videoconference, videoconference recording server 208 sends a command to that videoconference client 106 that contains a list of all the media used during the course of the videoconference. In response, videoconference client 106 begins downloading the media items to prepare for their use during playback.

Figure 12:
FIG. 12 shows the format of a media item list sent by a videoconference recording server to a videoconference client according to an embodiment of the present invention.

FIG. 12 shows the format of a media item list 1200 sent by a videoconference recording server 208 to a videoconference client 106 according to an embodiment of the present invention. Media item list 1200 includes a media record 1202 for each media item used in the videoconference. Each media record 1202 includes a time stamp 1204 indicating a time of occurrence of the media item in the videoconference, a description 1206 of the media item, a pages identifier 1208 indicating one or more pages displayed in the media item during the videoconference, indicators of the filename 1210, file size 1212, and time last modified 1214, the media ID 1216, media type 1218, owner ID 1220 indicating an owner of the media item, and one or more URLs 1222 where the media item can be obtained.

During the course of a videoconference, a media item may be displayed and re-displayed a number of times. When a user clicks to display a media item, the user's videoconference client 106 sends a command to videoconference server 104, which then distributes the command to all the connected videoconference clients 106. On receiving the command, a videoconference client 106 displays the media item identified by the media ID and page number in the received command. In order to reproduce this flow of displayed media items in the recorded videoconference, videoconference post-processing module 306 creates an index file is created that identifies the display media events.

Figure 13:
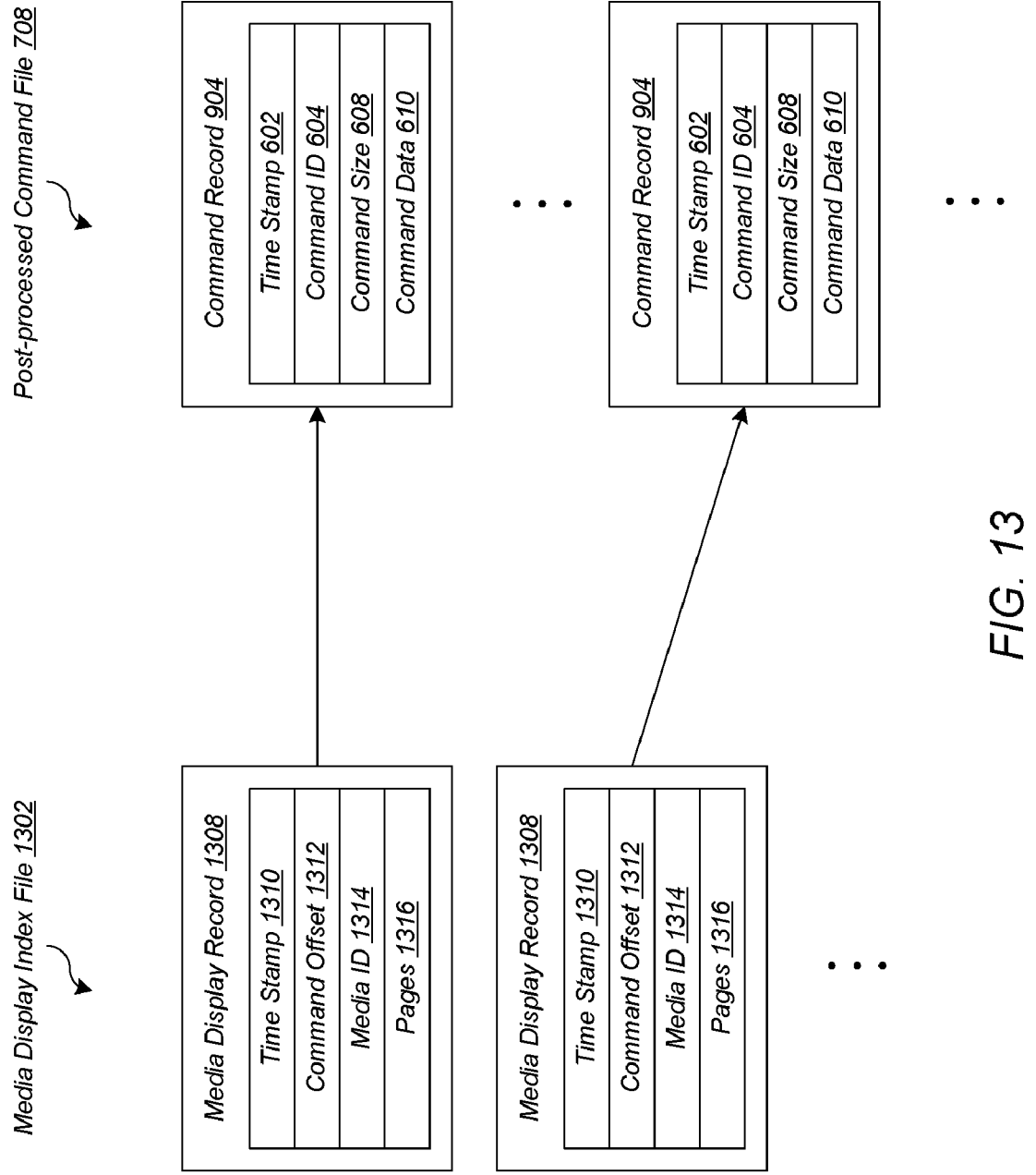
FIG. 13 shows portions of a media display index file and a post-processed command file for a recorded videoconference according to an embodiment of the present invention.

FIG. 13 shows portions of a media display index file 1302 and a post-processed command file 708 for a recorded videoconference according to an embodiment of the present invention. Post-processed command file 708 includes a plurality of command records 904, which can have the same format as records 600 in raw command file 412. Media display index file 1302 includes a media display record 1308 for each media command in post-processed command file 708, as well as a reference to the media command in post-processed command file 708 in the form of a pointer or the like. Each media display record 1308 includes a time stamp 1310 indicating a time of occurrence of the command, a command offset 1312 indicating an offset of the command into post-processed command file 708, a media ID 1314 indicating the media associated with the media display command, and a pages identifier 1316 indicating one or more pages displayed in the media item during the videoconference. Media display records 1308 are arranged in chronological order in media display index file 1302 to facilitate seek operations, as described below.

When a videoconference is scheduled, the videoconference administrator will designate which users can participate. During the course of the videoconference, participants can be added and removed. When a videoconference client 106 connects to videoconference server 104, videoconference server 104 sends a command to videoconference client 106 containing a list of the invited participants for that videoconference. If the list of invited participants changes during the course of the videoconference, videoconference server 104 sends a command to videoconference clients 106 updating the list of invited participants.

During the course of a videoconference, participants can join and leave the videoconference. Each of these events causes videoconference server 104 to send another command to the connected videoconference clients 106 to update the connection status of the participant associated with the event.

During the post-processing phase, videoconference post-processing module 306 creates a participant data file to identify all invited participants by parsing raw command file 412 to extract all the commands that update the list of participants invited to the meeting. These commands are not copied to post-processed command file 708, but instead are recreated from the participant data file when a videoconference client 106 connects to videoconference recording server 208 to play back the videoconference. Videoconference post-processing module 306 also creates a list of connect/disconnect events for each participant.

Figure 14:
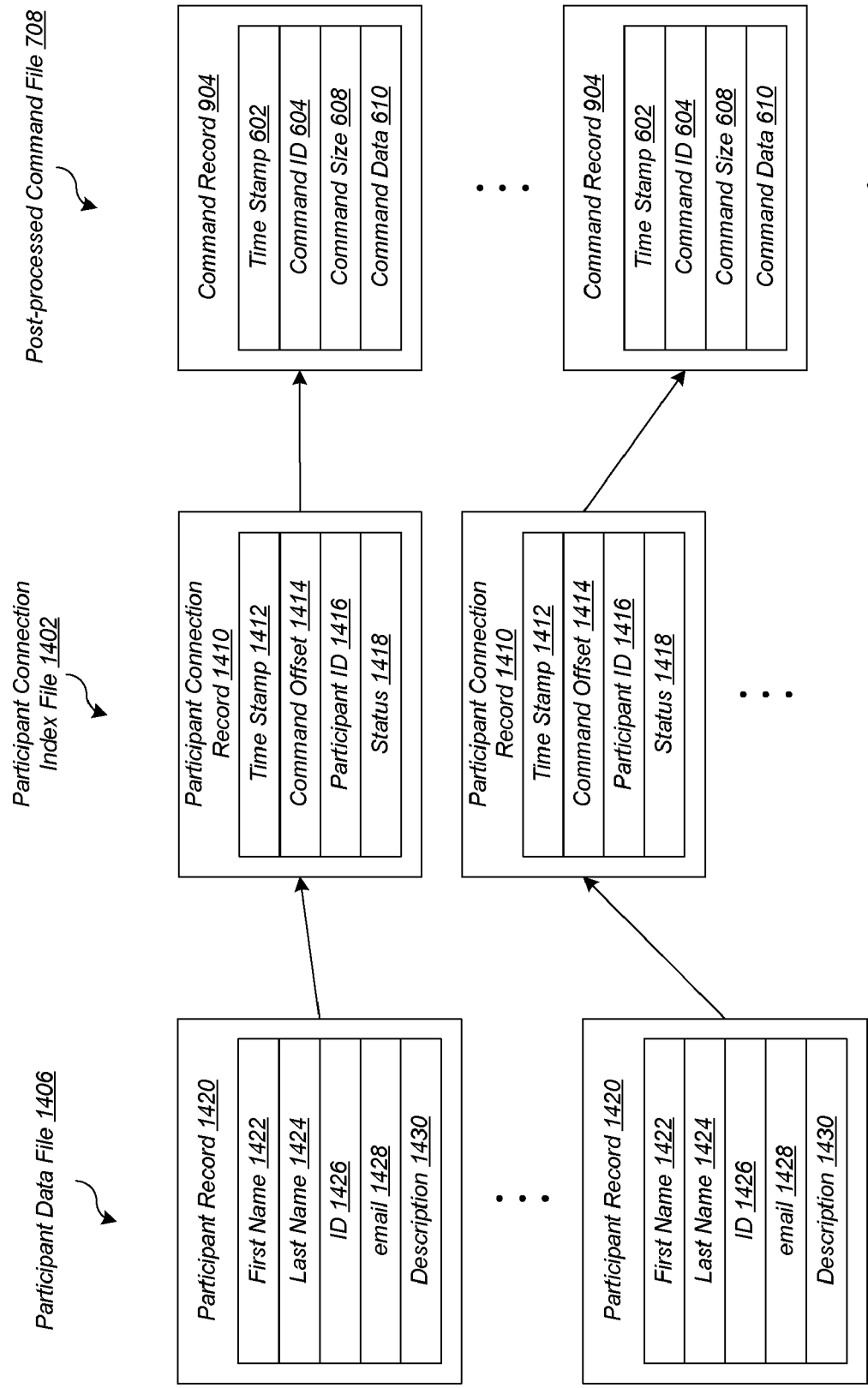
FIG. 14 shows portions of a participant connection index file, a post-processed command file, and a participant data file for a recorded videoconference according to an embodiment of the present invention.

FIG. 14 shows portions of a participant connection index file 1402, a post-processed command file 708, and a participant data file 1406 for a recorded videoconference according to an embodiment of the present invention. Post-processed command file 708 includes a plurality of command records 904, which can have the same format as records 600 in raw command file 412. Participant connection index file 1402 includes a participant connection record 1410 for each participant connection command in post-processed command file 708, as well as a reference to the media command in the form of a pointer or the like. Each participant connection record 1410 includes a time stamp 1412 indicating a time of occurrence of the command, a command offset 1414 indicating an offset of the command into post-processed command file 708, a participant ID 1416 identifying the participant associated with the participant connection command, and a status identifier 1418 indicating a connection status of the participant.

Participant data file 1406 includes a participant record 1420 for each participant invited to the videoconference. Each participant record 1420 includes, for the participant, first and last names 1422, 1424, a participant ID 1426, an email address 1428, and a description 1430. Each participant record 1420 also includes references to one or more participant connection records 1410. Each reference can take the form of a pointer or the like.

Figure 15:
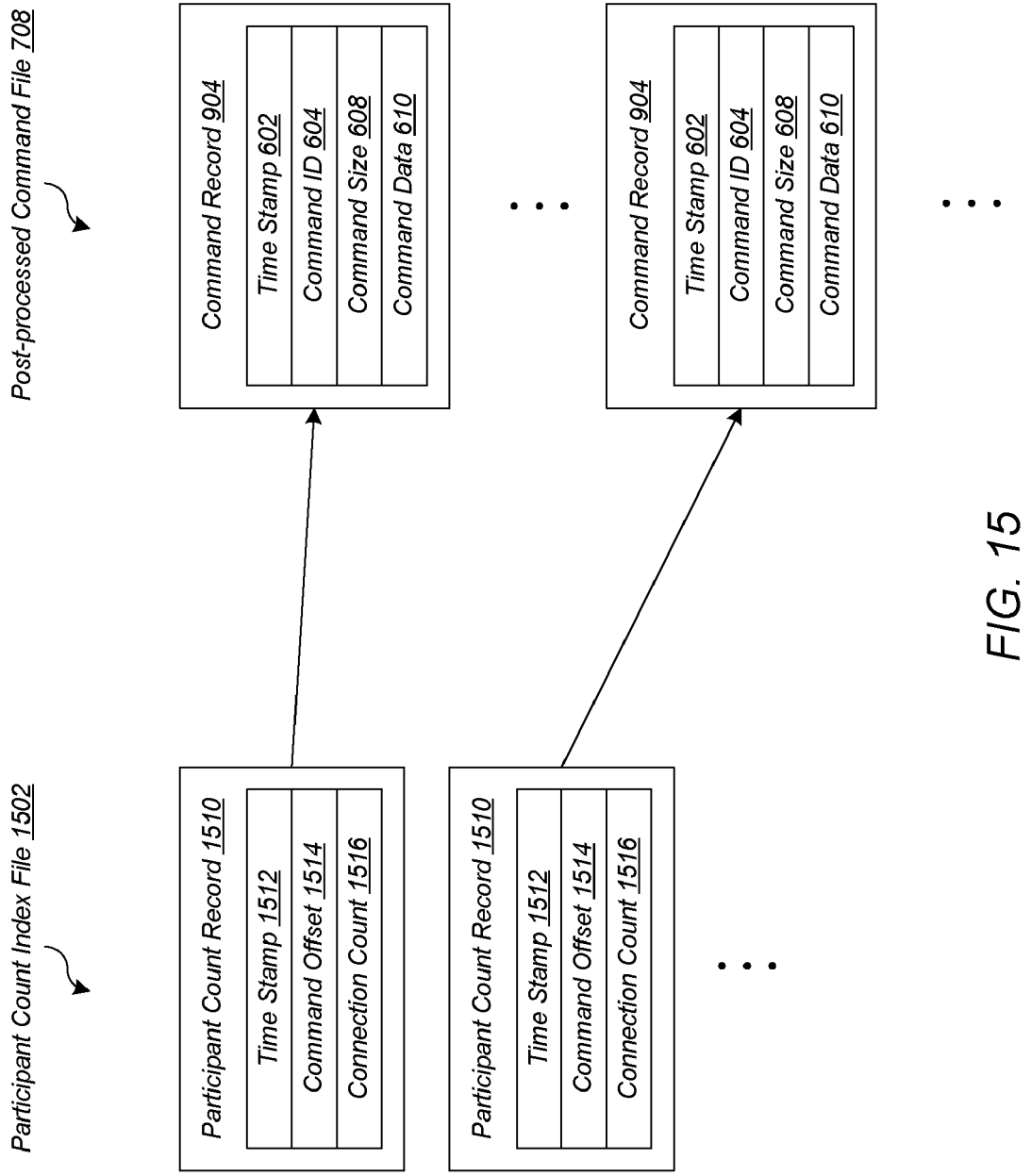
FIG. 15 shows portions of a participant count index file and a post-processed command file for a recorded videoconference according to an embodiment of the present invention.

Videoconference post-processing module 306 also creates a participant count index file. FIG. 15 shows portions of a participant count index file 1502 and a post-processed command file 708 for a recorded videoconference according to an embodiment of the present invention. Post-processed command file 708 includes a plurality of command records 904, which can have the same format as records 600 in raw command file 412. Participant count index file 1502 includes a participant count record 1510 for each participant connection command in post-processed command file 708, as well as a reference to the command in the form of a pointer or the like. Each participant count record 1510 includes a time stamp 1512 indicating a time of occurrence of the command, a command offset 1514 indicating an offset of the command into post-processed command file 708, and a connection count 1516 indicating the number of connected participants following execution of the command. Participant count index file 1502 allows the number of connected participants at a given seek time to be determined quickly. Participant count records 1510 are arranged in chronological order in participant count index file 1502 to facilitate seek operations, as described below.

Videoconference post-processing module 306 also creates a command index file including records that point to the time and file offset of commands in post-processed command file 708. The command index file allows videoconference playback module 310 to quickly identify the closest command when seeking to a new seek time during playback.

Figure 16:
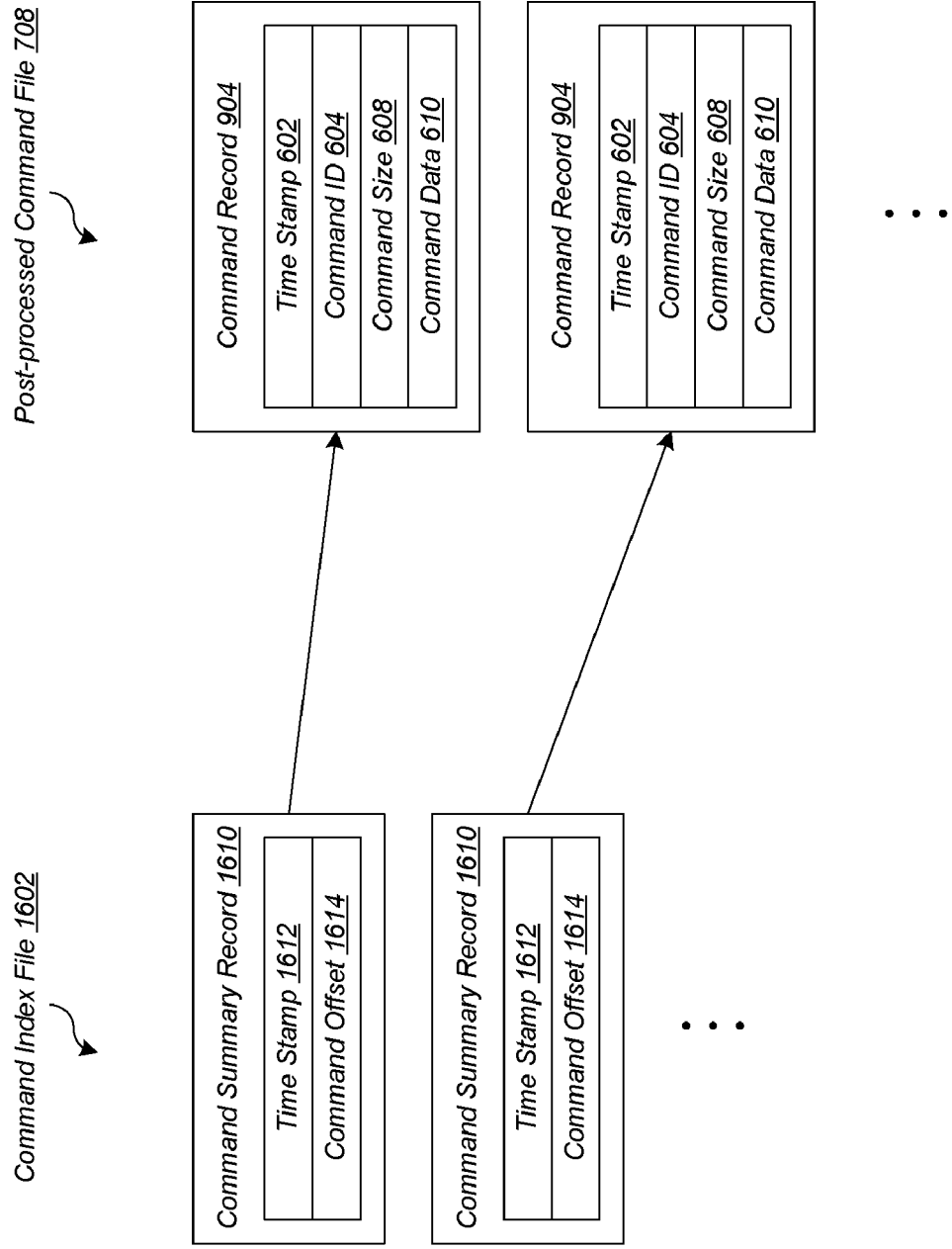
FIG. 16 shows portions of a command index file and a post-processed command file for a recorded videoconference according to an embodiment of the present invention.

FIG. 16 shows portions of a command index file 1602 and a post-processed command file 708 for a recorded videoconference according to an embodiment of the present invention. Post-processed command file 708 includes a plurality of command records, which can have the same format as records 600 in raw command file 412. Command index file 1602 includes a command summary record 1610 for each command in post-processed command file 708, as well as a reference to the command in post-processed command file 708 in the form of a pointer or the like. Each command summary record 1610 includes a time stamp 1612 indicating a time of occurrence of the command and a command offset 1614 indicating an offset of the command into post-processed command file 708. Command summary records 1610 are arranged in chronological order in command index file 1602 to facilitate seek operations, as described below.

Figure 17:
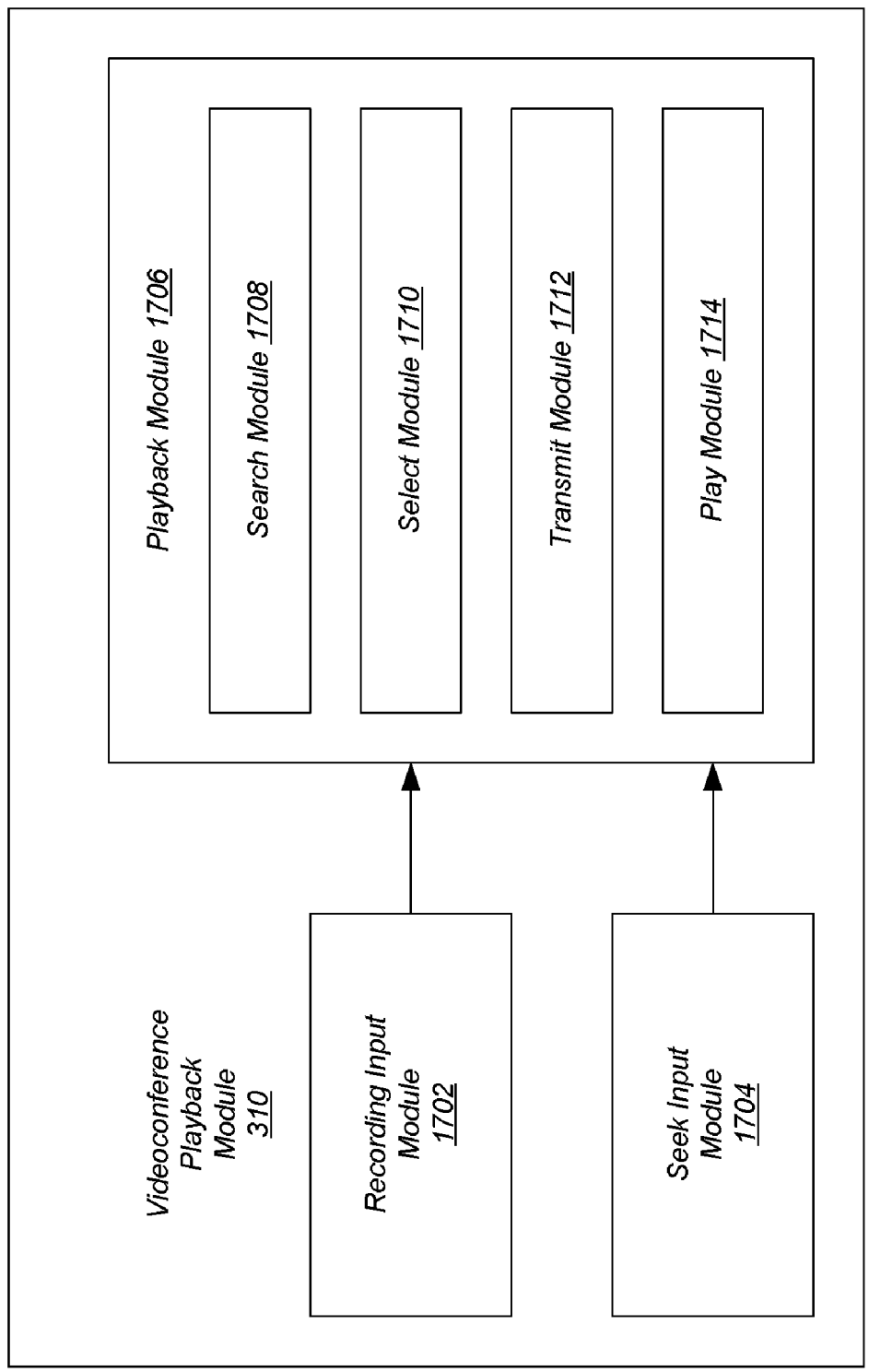
FIG. 17 shows detail of a videoconference playback module according to an embodiment of the present invention.

After post-processing, a videoconference is ready for playback. Referring again to FIG. 3, videoconference playback is handled by videoconference playback module 310 of videoconference recording server 208. FIG. 17 shows detail of videoconference playback module 310 according to an embodiment of the present invention. Referring to FIG. 17, videoconference playback module 310 includes a recording input module 1702 adapted to receive a post-processed videoconference recording 308, a seek input module 1704 adapted to receive a seek time for beginning playback of post-processed videoconference recording 308, and a playback module 1706 adapted to play back the videoconference. Playback module 1706 includes a search module 1708, a select module 1710, a transmit module 1712, and a play module 1714.

Figure 18A:
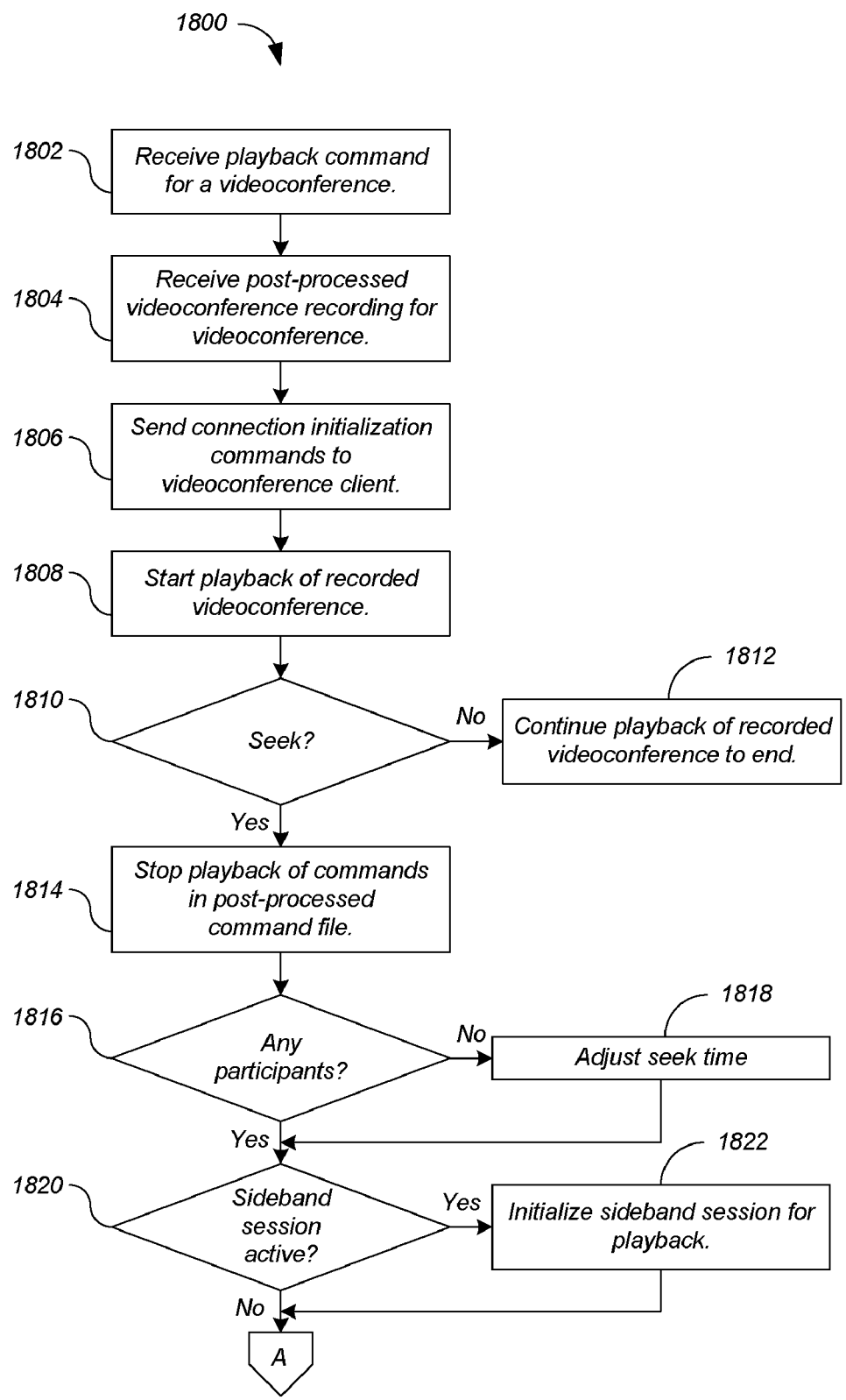
FIG. 18 shows a process for the videoconference playback module of FIG. 17 according to an embodiment of the present invention.
Figure 18B:
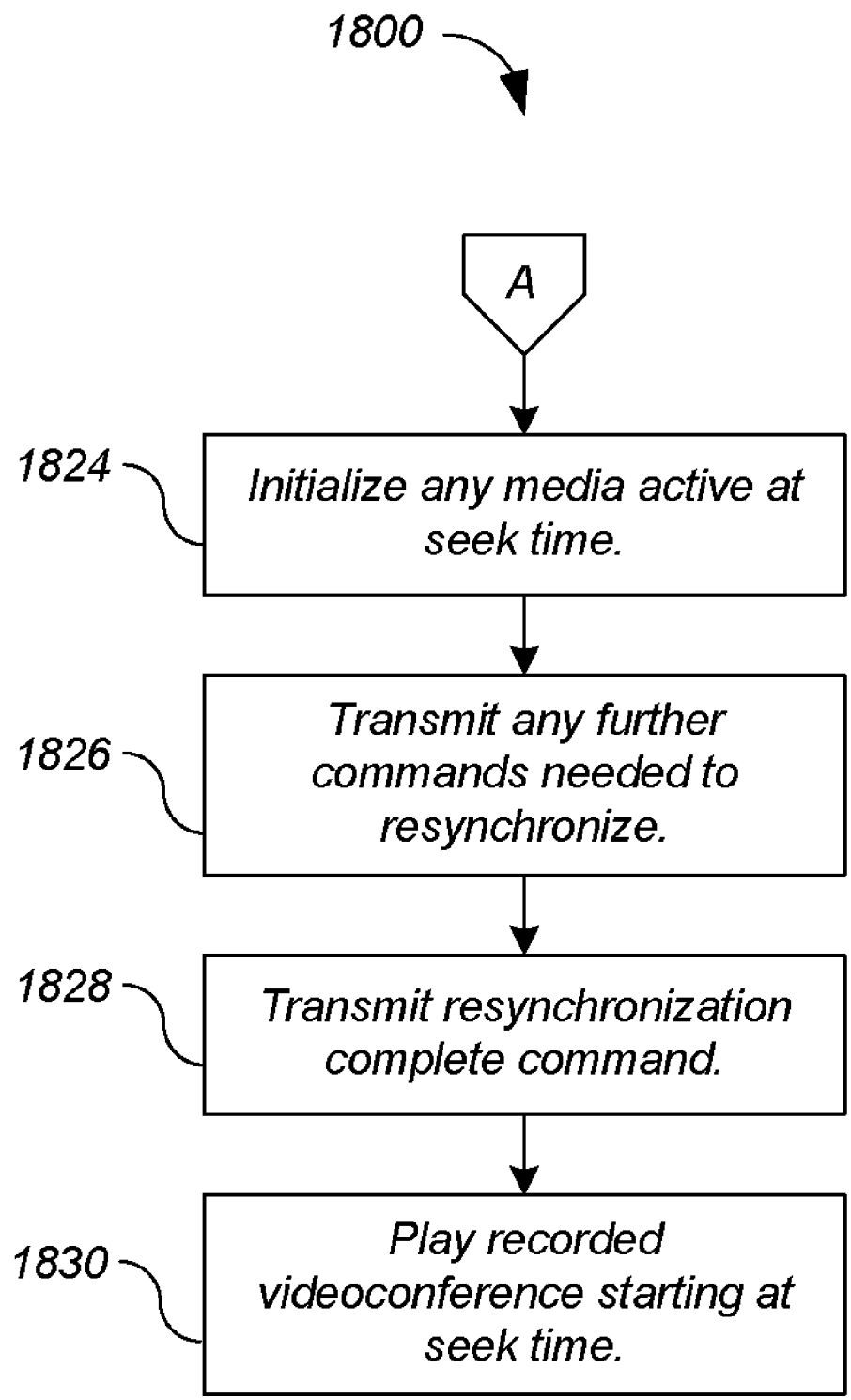

FIG. 18 shows a process 1800 for videoconference playback module 310 of FIG. 17 according to an embodiment of the present invention. Although in the described embodiments, the elements of process 1800 are presented in one arrangement, other embodiments may feature other arrangements, as will be apparent to one skilled in the relevant arts based on the disclosure and teachings provided herein. For example, in various embodiments, some or all of the steps of process 1800 can be executed in a different order, concurrently, and the like.

Referring to FIG. 18, a videoconference client 106 initiates playback of a recorded videoconference by sending a playback command that identifies the videoconference. Videoconference playback module 310 receives the playback command (step 1802). In response, recording input module 1702 of videoconference playback module 310 receives the post-processed videoconference recording 308 for the videoconference (step 1804). Post-processed videoconference recording 308 can include recorded A/V streams 406 for the videoconference, a post-processed command file 708 for the videoconference, one or more index files 706, and one or more media files 408 associated with the videoconference.

Referring again to FIG. 18, videoconference playback module 310 next sends connection initialization commands to videoconference client 106 (step 1806). The connection initialization commands can include the recorded videoconference time, media item list 1200, participant data file 1406, and the like. Videoconference client 106 can then obtain any media items in media list 1200, as described above. Playback module 1706 of videoconference post-processing module 306 then starts playback of the recorded videoconference (step 1808) by starting transmission of the recorded A/V streams 406, and sending commands in post-processed command file 708, to videoconference client 106. The commands are sent in chronological order, based on the timestamps of the commands.

To seek to a new position in the recorded videoconference, videoconference client 106 can send a seek command to videoconference recording server 208 designating the seek time. If no seek commands are received from videoconference client 106 (step 1810), playback module 1706 simply continues playing the recorded videoconference from start to finish (step 1812). But if a seek command is received (step 1810), playback module 1706 seeks to the seek time, and resumes playback from the seek time.

In particular, videoconference playback module 310 stops the playback of the commands in post-processed command file 708 (step 1814), and then resynchronizes videoconference client 106. The resynchronization process includes sending a resynchronization start message to notify videoconference client 106 that the commands that follow are not part of the timed playback of the videoconference, but rather are to be used to resynchronize videoconference client 106 to the requested seek time.

Participant count index file 1502 is searched to determine the number of participants in the videoconference at the seek time (step 1816). If no participants were connected at the seek time, for example because the participants had taken a break, the seek time can be advanced to the next time at which one or more participants were connected to the videoconference, again using participant count index file 1502 (step 1818). Participant count index file 1502 can also be used to display the number and identity of the connected participants during playback, for example in a panel of a playback window of videoconference client 106.

Sideband session index file 902 is searched to determine if a sideband session was active at the seek time (step 1820). If so, the sideband session is initialized for playback (step 1822). In particular, videoconference playback module 310 retrieves the command offset 912 of the sideband session start command from sideband session index file 902, and uses command offset 912 to retrieve the sideband session start command from post-processed command file 708. Videoconference playback module 310 then sends the sideband session start command to videoconference client 106.

Next, screen buffer index file 1002 is searched to identify the screen buffer 1010, if any, immediately preceding the seek time. If such a screen buffer 1010 exists, videoconference playback module 310 retrieves the screen buffer 1010, generates a new command using the data in the screen buffer 1010, and sends the new command to videoconference client 106. Next, videoconference playback module 310 sends any screen update commands, from the time stamp of the screen buffer to the seek time, to videoconference client 106. If no screen buffer exists from the application sharing start time to the seek time, videoconference playback module 310 sends all the screen update commands, from the time of the session start to the seek time, to videoconference client 106. At this point the application sharing buffer at videoconference client 106 is synchronized up to the desired seek time.

Figure 19:
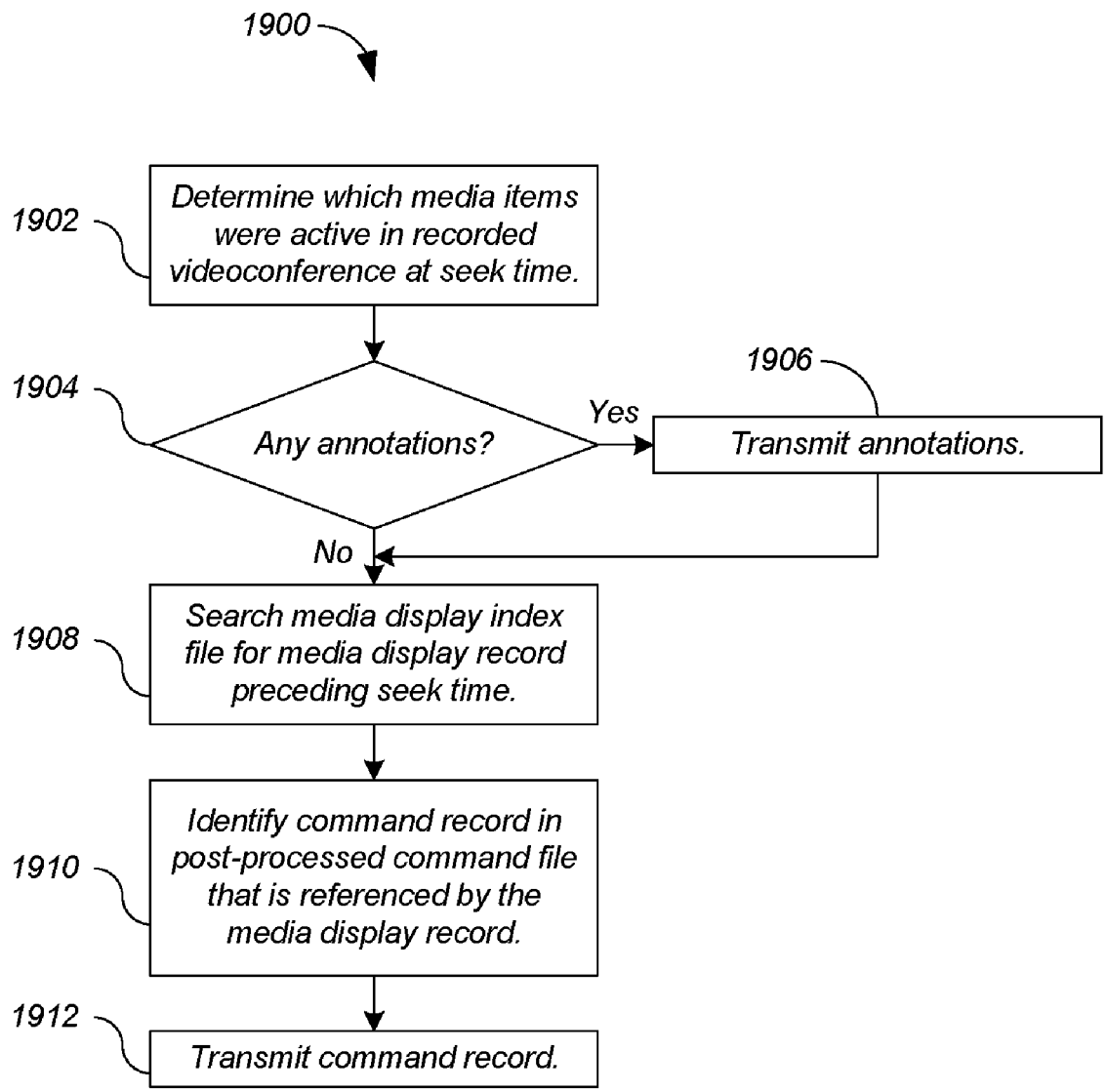
FIG. 19 shows a process for media initialization according to an embodiment of the present invention.

Next, any media active at the seek time is initialized (step 1824). FIG. 19 shows a process 1900 for media initialization according to an embodiment of the present invention. Although in the described embodiments, the elements of process 1900 are presented in one arrangement, other embodiments may feature other arrangements, as will be apparent to one skilled in the relevant arts based on the disclosure and teachings provided herein. For example, in various embodiments, some or all of the steps of process 1900 can be executed in a different order, concurrently, and the like.

Referring to FIG. 19, media items list 1200 is searched to determine which media items were active in the recorded videoconference at the seek time (step 1902). For each media item that is active at the seek time, annotation index file 1102 is searched for any annotations associated with the media item (step 1904). Each annotation found in annotation index file 1102 is read using the command offset 1112 in the corresponding annotation record 1108, and is sent to videoconference client 106 (step 1906).

Next, media display index file 1302 is searched to determine the media item displayed at the seek time in the videoconference. In particular, search module 1708 (FIG. 17) of videoconference playback module 310 (FIG. 3) searches media display index file 1302 for a media display record 1308 preceding the seek time (step 1908). Select module 1710 identifies the command record 1306 in post-processed command file 708 that is referenced by the media display record 1308 (step 1910). Transmit module 1712 transmits command record 1306 to videoconference client 106 (step 1912).

Referring again to FIG. 18, videoconference playback module 310 transmits any further commands needed to resynchronize videoconference client 106 to the seek time (step 1826). For example, all of the commands between a predetermined command offset and the requested seek time can be sent. The predetermined command offset can be the greater of the command offset 1312 of the media display record 1308 sent in step 1910 and the command offset 912 of the sideband session start command in step 1822.

At this point, videoconference client 106 has been resynchronized to the requested seek time. Videoconference playback module therefore sends a command to videoconference client 106 indicating that the resynchronization process is complete (step 1828). Videoconference client 106 acknowledges the command. In response, play module 1714 plays the recorded videoconference starting at the seek time (step 1830). In particular, play module 1714 plays the audio and video streams of the videoconference, and transmits commands from post-processed command file 708, starting from the seek time.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of implementations of the invention have been described. Nevertheless, it will be understood that various modifications may be made without departing from the spirit and scope of the invention. Accordingly, other implementations are within the scope of the following claims.

What is claimed is:

1. A non-transitory computer-readable media embodying instructions executable by a processing device to perform a method of recording a videoconference over a network comprising:
    recording audio and video streams of the videoconference;
    storing media files associated with the videoconference;
    generating a raw command file comprising command records of all commands distributed over said network to all participants of the videoconference during the videoconference, wherein each of said command records include at least a command-time-stamp indicating the time of occurrence in the videoconference of its corresponding command and a command ID identifying its corresponding command;
    generating a post-processed command file made up of the command records from said raw command file that corresponds to commands necessary for the playback of the recorded videoconference;
    generating a sideband session index of sideband commands found in said post-processed command file, said sideband commands being associated with streaming sessions started and ended during the videoconference, said sideband session index file having sideband session records including a sideband-time-stamp indicative of its time of occurrence, a participant ID indicating the videoconference participant responsible for the sideband command, and a position indicator noting the position of the sideband command within said post-processed command file;
    generating a plurality of sideband-screen images, each having a one-to-one correspondence with a corresponding sideband command within the sideband session index, the number of said sideband-screen images being smaller than the number of sideband commands within the sideband session index, each of said sideband-screen images representing a complete up-to-date image as it would appear in the videoconference at the time of its corresponding sideband command; and
    generating a screen buffer index of said multiple sideband-screen images, said screen buffer index including a separate screen buffer record per sideband-screen image, each screen buffer record identifying its corresponding sideband-screen image and its corresponding sideband command, its corresponding sideband-time-stamp, and a position indicator noting the position of its corresponding sideband command within said post-processed command file.

2. The computer-readable media of claim 1, wherein said raw command file comprising command records of all commands distributed over said network to all participants of the videoconference during the videoconference.

3. The computer-readable media of claim 1, wherein the sideband commands corresponding to said sideband-screen images are nonconsecutive sideband commands within the sideband session index.

4. The computer-readable media of claim 1, further including:
    generating a participant index indicative of when any of said participants of the videoconference join or leave the videoconference in accordance with commands within said post-processed command file associated with joining or leaving the videoconference, said participant index having participants records identifying the videoconference participant responsible for the respective join or leave associated command, a participant-time-stamp of the respective command, a position indicator noting the position of its corresponding join and leave associated command within said post-processed command file, and a pointer to a participant data file corresponding to the participant responsible for the respective join or leave associated command.

5. The computer-readable media of claim 1, further including:
    generating a participant count index having a participant count record for each command in said post-processed command file that indicates a change in the number of videoconference participants, a participant-count-time stamp for each corresponding command and a position indicator noting the position of its corresponding command within said post-processed command file.

6. The computer-readable media of claim 5, wherein during playback of said videoconference, in response to a viewer of the played back videoconference selecting a viewing seek time intermediate the duration of the videoconference:
    IF the participant count index indicates that there is not more than a first number of participants at the selected viewing seek time, THEN advancing the selected viewing seek time to the closest later viewing seek time when said participant count index indicates that there is at least a second number of participants in the videoconference, said second number being greater than said first number.

7. The computer-readable media of claim 6, wherein said first number is zero.

8. The computer-readable media of claim 1, further comprising:
    generating an annotation index of annotation commands found in said post-processed command file, said annotation commands being associated with annotation of any of said media files with text, lines, or objects created during said videoconference, said annotation index including annotation records, each including a media ID indicating the media file associated with the annotation command, an annotation-time-stamp of its corresponding annotation command, and a position indicator noting the position of its corresponding annotation command within said post-processed command file.

9. The computer-readable media of claim 8, further comprising generating a media index indicative of when said media files are active within the videoconference, said media index file including a media-time-stamp;
    wherein during playback of said videoconference, in response to a viewer of the played back videoconference selecting a viewing seek time intermediate the duration of the videoconference:
    transmitting to the viewer the media file active at the current seek time as determined from said media index; and transmitted to the viewer all annotation commands recorded from the media-time-stamp of the transmitted media file to the current seek time.

10. The computer-readable media of claim 1, wherein during playback of said videoconference, in response to a viewer of the played back videoconference selecting a viewing seek time intermediate the duration of the videoconference:

from said screen buffer index, identifying and transmitting to the viewer the screen image immediately preceding the current viewing seek time, and from said sideband session index, transmitting to said viewers all the sideband commands recorded from the sideband-time-stamp of the transmitted screen image to the current viewing seek time.

11. The computer-readable media of claim 1, further including:

generating a media index indicative of when said media files are active within the videoconference, said media index file including a media-time-stamp;

generating a participant count index having a participant count record for each command in said post-processed command file that indicates a change in the number of videoconference participants, a participant-count-time stamp for each corresponding command and a position indicator noting the position of its corresponding command within said post-processed command file; and generating an annotation index of annotation commands found in said post-processed command file, said annotation commands being associated with annotation of any of said media files with text, lines, or objects created during said videoconference, said annotation index including annotation records, each including a media ID indicating the media file associated with the annotation command, an annotation-time-stamp of its corresponding annotation command, and a position indicator noting the position of its corresponding annotation command within said post-processed command file;

wherein during playback of said videoconference, in response to a viewer of the played back videoconference selecting a viewing seek time intermediate the duration of the videoconference:

(a) IF the participant count index indicates that there are not more than a first number of participants at the selected viewing seek time, THEN advancing the selected viewing seek time to the closest later viewing seek time when said participant count index indicates that there is at least a second number of participants in the videoconference;

(b) from said screen buffer index, identifying and transmitting to the viewer the screen image immediately preceding the current viewing seek time, and from said sideband session index, transmitting to said viewers all the sideband commands recorded from the sideband-time-stamp of the transmitted screen image to the current viewing seek time;

(c) transmitting to the viewer the media active at the current seek time as determined from said media index; and (d) transmitted to the viewer all annotation commands recorded from the media-time-stamp of the transmitted media to the current seek time.

12. The computer-readable media of claim 11, wherein said first number is zero.

13. The computer-readable media of claim 12, wherein said second number is one.

14. An apparatus for recording a videoconference over a network comprising:

a processing device implementing the following steps:

recording audio and video streams of the videoconference;

storing media files associated with the videoconference;

generating a raw command file comprising command records of all commands distributed over said network to all participants of the videoconference during the videoconference, wherein each of said command records include at least a command-time-stamp indicating the time of occurrence in the videoconference of its corresponding command and a command ID identifying its corresponding command;

generating a post-processed command file made up of the command records from said raw command file that corresponds to commands necessary for the playback of the recorded videoconference;

generating a sideband session index of sideband commands found in said post-processed command file, said sideband commands being associated with streaming sessions started and ended during the videoconference, said sideband session index file having sideband session records including a sideband-time-stamp indicative of its time of occurrence, a participant ID indicating the videoconference participant responsible for the sideband command, and a position indicator noting the position of the sideband command within said post-processed command file;

generating a plurality sideband-screen images, each having a one-to-one correspondence with a corresponding sideband command within the sideband session index, the number of said sideband-screen images being smaller than the number of sideband command within the sideband session index, each of said sideband-screen images representing a complete up-to-date image as it would appear in the videoconference at the time of its corresponding sideband command; and generating a screen buffer index of said multiple sideband-screen images, said screen buffer index including a separate screen buffer record per sideband-screen image, each screen buffer record identifying its corresponding sideband-screen image and its corresponding sideband command, its corresponding sideband-time-stamp, and a position indicator noting the position of its corresponding sideband command within said post-processed command file.

15. The apparatus of claim 14, wherein said raw command file comprises command records of all commands distributed over said network to all participants of the videoconference during the videoconference.

16. The apparatus of claim 14, wherein the sideband commands corresponding to said sideband-screen images are nonconsecutive sideband command within the sideband session index.

17. The apparatus of claim 14, further including:

generating a participant index indicative of when any of said participants of the videoconference join or leave the videoconference in accordance with commands within said post-processed command file associated with joining or leaving the videoconference, said participant index having participants records identifying the videoconference participant responsible for the respective join or leave associated command, a participant-time-stamp of the respective command, a position indicator noting the position of its corresponding join and leave associated command within said post-processed command file, and a pointer to a participant data file corresponding to the participant responsible for the respective join or leave associated command.

18. The apparatus of claim 14, further including:
generating a participant count index having a participant count record for each command in said post-processed command file that indicates a change in the number of videoconference participants, a participant-count-time stamp for each corresponding command and a position indicator noting the position of its corresponding command within said post-processed command file.

19. The apparatus of claim 18, wherein during playback of said videoconference, in response to a viewer of the played back videoconference selecting a viewing seek time intermediate the duration of the videoconference:
IF the participant count index indicates that there is not more than a first number of participants at the selected viewing seek time, THEN advancing the selected viewing seek time to the closest later viewing seek time when said participant count index indicates that there is at least a second number of participants in the videoconference, said second number being greater than said first number.

20. The apparatus of claim 19, wherein said first number is zero.

21. The apparatus of claim 14, further comprising:
generating an annotation index of annotation commands found in said post-processed command file, said annotation commands being associated with annotation of any of said media files with text, lines, or objects created during said videoconference, said annotation index including annotation records, each including a media ID indicating the media file associated with the annotation command, an annotation-time-stamp of its corresponding annotation command, and a position indicator noting the position of its corresponding annotation command within said post-processed command file.

22. The apparatus of claim 14, wherein during playback of said videoconference, in response to a viewer of the played back videoconference selecting a viewing seek time intermediate the duration of the videoconference:
from said screen buffer index, identifying and transmitting to the viewer the screen image immediately preceding the current viewing seek time, and from said sideband session index, transmitting to said viewers all the sideband commands recorded from the sideband-time-stamp of the transmitted screen image to the current viewing seek time.

23. The apparatus of claim 14, further including:
generating a media index indicative of when said media files are active within the videoconference, said media index file including a media-time-stamp;
generating a participant count index having a participant count record for each command in said post-processed command file that indicates a change in the number of videoconference participants, a participant-count-time stamp for each corresponding command and a position indicator noting the position of its corresponding command within said post-processed command file; and
generating an annotation index of annotation commands found in said post-processed command file, said annotation commands being associated with annotation of any of said media files with text, lines, or objects created during said videoconference, said annotation index including annotation records, each including a media ID indicating the media file associated with the annotation command, an annotation-time-stamp of its corresponding annotation command, and a position indicator noting the position of its corresponding annotation command within said post-processed command file;
wherein during playback of said videoconference, in response to a viewer of the played back videoconference selecting a viewing seek time intermediate the duration of the videoconference:
(a) IF the participant count index indicates that there are not more than a first number of participants at the selected viewing seek time, THEN advancing the selected viewing seek time to the closest later viewing seek time when said participant count index indicates that there is at least a second number of participants in the videoconference;
(b) from said screen buffer index, identifying and transmitting to the viewer the screen image immediately preceding the current viewing seek time, and from said sideband session index, transmitting to said viewers all the sideband commands recorded from the sideband-time-stamp of the transmitted screen image to the current viewing seek time;
(c) transmitting to the viewer the media active at the current seek time as determined from said media index; and
(d) transmitted to the viewer all annotation commands recorded from the media-time-stamp of the transmitted media to the current seek time.

24. The apparatus of claim 23, wherein said first number is zero and said second number is one.

\* \* \* \* \*